US012579194B2

(12) United States Patent
Joyce et al.

(10) Patent No.: US 12,579,194 B2
(45) Date of Patent: *Mar. 17, 2026

(54) DIGITAL SUPPLEMENT ASSOCIATION AND RETRIEVAL FOR VISUAL SEARCH

(71) Applicant: Google LLC, Mountain View, CA (US)

(72) Inventors: Alan Lee Joyce, Mountain View, CA (US); Edgar Chung, Mountain View, CA (US); Zhe Yang, Santa Clara, CA (US); Ian Mesa, Los Gatos, CA (US); Joseph Olson, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/735,866

(22) Filed: Jun. 6, 2024

(65) Prior Publication Data

US 2024/0320269 A1    Sep. 26, 2024

Related U.S. Application Data

(63) Continuation of application No. 18/189,805, filed on Mar. 24, 2023, now Pat. No. 12,032,633, which is a
(Continued)

(51) Int. Cl.
*G06F 16/00*        (2019.01)
*G06F 16/58*        (2019.01)
(Continued)

(52) U.S. Cl.
CPC ........ *G06F 16/90335* (2019.01); *G06F 16/58* (2019.01); *G06F 16/583* (2019.01); *G06F 16/9535* (2019.01); *G06N 5/046* (2013.01)

(58) Field of Classification Search
CPC .. G06F 16/90335; G06F 16/583; G06F 16/58; G06F 16/9535; G06N 5/046
(Continued)

(56) References Cited

U.S. PATENT DOCUMENTS 6,311,194 B1    10/2001    Sheth et al.
7,668,814 B2    2/2010    Il
(Continued)

FOREIGN PATENT DOCUMENTS

CN        101777064 A        7/2010
CN        102576372 A        7/2012
(Continued)

OTHER PUBLICATIONS

Communication pursuant to Article 94(3) EPC for European Application No. 19735444.2, mailed Feb. 21, 2023, 8 pages.
(Continued)

*Primary Examiner* — Monica M Pyo
(74) *Attorney, Agent, or Firm* — DORITY & MANNING P.A.

(57)        ABSTRACT

Systems and methods for identification and retrieval of content for visual search are provided. An example method includes receiving data specifying a digital supplement. The data may identify a digital supplement and a supplement anchor for associating the digital supplement with visual content. The method may also include generating a data structure instance that specifies the digital supplement and the supplement anchor and, after generating the data structure instance, enabling triggering of the digital supplement by an image based at least on storing the data structure instance in a database that includes a plurality of other data structure instances. The other data structure instances may each specify a digital supplement and one or more supplement anchors.

20 Claims, 13 Drawing Sheets

Related U.S. Application Data continuation of application No. 16/949,890, filed on Nov. 19, 2020, now Pat. No. 11,640,431, which is a continuation of application No. 16/014,520, filed on Jun. 21, 2018, now Pat. No. 10,878,037.

(51) Int. Cl.

| | |
|---|---|
| *G06F 16/583* | (2019.01) |
| *G06F 16/903* | (2019.01) |
| *G06F 16/9535* | (2019.01) |
| *G06N 5/046* | (2023.01) |

(58) Field of Classification Search
USPC .......................................................... 707/769
See application file for complete search history.

(56) References Cited

U.S. PATENT DOCUMENTS

| | | | | |
|---|---|---|---|---|
| 8,149,911 | B1 | 4/2012 | Alvarez et al. | |
| 8,429,173 | B1 | 4/2013 | Rosenberg et al. | |
| 8,456,488 | B2 * | 6/2013 | Ubillos | G06T 11/00 |
| | | | | 345/441 |
| 8,473,525 | B2 * | 6/2013 | McIntyre | G06F 16/51 |
| | | | | 707/803 |
| 8,923,400 | B1 | 12/2014 | Alvarez et al. | |
| 9,087,059 | B2 * | 7/2015 | Petrou | G06F 16/434 |
| 9,489,401 | B1 * | 11/2016 | Garcia | G06F 16/5838 |
| 10,210,178 | B2 | 2/2019 | Souche et al. | |
| 10,878,037 | B2 | 12/2020 | Joyce et al. | |
| 11,023,106 | B2 | 6/2021 | Joyce et al. | |
| 11,082,246 | B1 | 8/2021 | Olson et al. | |
| 11,640,431 | B2 | 5/2023 | Joyce et al. | |
| 2006/0268007 | A1 | 11/2006 | Gopalakrishnan | |
| 2007/0133947 | A1 | 6/2007 | Armitage et al. | |
| 2008/0005668 | A1 * | 1/2008 | Mavinkurve | G06F 16/9577 |
| | | | | 715/764 |
| 2008/0208589 | A1 | 8/2008 | Cross et al. | |
| 2009/0102859 | A1 | 4/2009 | Athsani et al. | |
| 2010/0162179 | A1 | 6/2010 | Porat | |
| 2011/0035406 | A1 * | 2/2011 | Petrou | G06F 16/438 |
| | | | | 707/769 |
| 2011/0176724 | A1 | 7/2011 | Yang et al. | |
| 2011/0196859 | A1 | 8/2011 | Mei et al. | |
| 2012/0128251 | A1 | 5/2012 | Petrou et al. | |
| 2012/0254076 | A1 | 10/2012 | Yang et al. | |
| 2012/0263154 | A1 | 10/2012 | Blanchflower et al. | |
| 2013/0275164 | A1 | 10/2013 | Gruber et al. | |
| 2013/0293580 | A1 | 11/2013 | Spivack | |
| 2014/0059458 | A1 | 2/2014 | Levien et al. | |
| 2014/0100997 | A1 | 4/2014 | Mayerle et al. | |
| 2014/0365334 | A1 | 12/2014 | Hurewitz | |
| 2015/0254905 | A1 | 9/2015 | Ramsby et al. | |
| 2016/0026628 | A1 | 1/2016 | Sears | |
| 2016/0098426 | A1 | 4/2016 | Sayko et al. | |
| 2016/0224837 | A1 | 8/2016 | Lipert et al. | |
| 2017/0004655 | A1 | 1/2017 | Scavezze et al. | |
| 2017/0124618 | A1 | 5/2017 | Roeseler et al. | |
| 2017/0161382 | A1 | 6/2017 | Ouimet et al. | |

| | | | | |
|---|---|---|---|---|
| 2017/0351710 | A1 | 12/2017 | Zhu et al. | |
| 2018/0011877 | A1 | 1/2018 | Boncyk et al. | |
| 2018/0082152 | A1 | 3/2018 | Katz et al. | |
| 2018/0084309 | A1 | 3/2018 | Katz et al. | |
| 2018/0084310 | A1 | 3/2018 | Katz et al. | |
| 2018/0096504 | A1 * | 4/2018 | Valdivia | G06F 3/167 |
| 2018/0165370 | A1 | 6/2018 | Garcia et al. | |
| 2019/0276177 | A1 | 9/2019 | Flores | |
| 2019/0391715 | A1 | 12/2019 | Joyce et al. | |
| 2019/0392084 | A1 | 12/2019 | Joyce et al. | |
| 2020/0057486 | A1 | 2/2020 | Sugihara et al. | |
| 2021/0029075 | A1 | 1/2021 | Yu | |

FOREIGN PATENT DOCUMENTS

| | | | |
|---|---|---|---|
| CN | 103582884 | A | 2/2014 |
| CN | 103959284 | A | 7/2014 |
| CN | 104685501 | A | 6/2015 |
| CN | 106156063 | A | 11/2016 |
| CN | 107111640 | A | 8/2017 |
| JP | 2009505288 | A | 2/2009 |
| JP | 2011048461 | A | 3/2011 |
| JP | 2012048648 | | 3/2012 |
| JP | 2012155362 | A | 8/2012 |
| JP | 2013077328 | A | 4/2013 |
| JP | 2015501982 | A | 1/2015 |
| JP | 2015207258 | A | 11/2015 |
| JP | 2016519377 | A | 6/2016 |
| JP | 2017157193 | A | 9/2017 |
| JP | 2017194848 | A | 10/2017 |
| JP | 2018084890 | | 5/2018 |
| WO | 2012096013 | A1 | 7/2012 |

OTHER PUBLICATIONS

First Examination Report for Indian Application No. 202047037458, mailed Nov. 25, 2021, 6 pages.
First Office Action for Chinese Application No. 201980022269.0 (with English translation), mailed Nov. 22, 2023, 31 pages.
International Search Report and Written Opinion for Application No. PCT/US2019/036542, mailed on Aug. 20, 2019, 10 pages.
Office Action for Korean Application No. 10-2020-7031107 (with English translation), mailed Oct. 19, 2022, 26 pages.
Reconsideration Report for Japanese Application No. 2020-570146, mailed Jul. 27, 2022, 3 pages.
Bridgingapps, Scanner Pro App, YouTube, https://www.youtube.com/watch?v=htl7VdwZeiA, Mar. 9, 2017, 1 page.
Newton, "Snapchat's Bitmoji avatars are now threedimensional and animated", The Verge, Sep. 14, 2017, 3 pages.
Peng, et al., "Visual knowledge representation based on image grammar and annotated database", Application Research of Computers, vol. 26, No. 2, Feb. 2009, 5 pages.
Qi, et al., "Linked Data for Mobile Visual Search System of Digital Library", Data Analysis and Knowledge Discovery, No. 1, Jan. 25, 2017, pp. 81-90.
U.S. Appl. No. 16/014,520, filed Jun. 21, 2018.
U.S. Appl. No. 16/949,890, filed Nov. 19, 2020.
U.S. Appl. No. 18/189,805, filed Mar. 24, 2023.

\* cited by examiner

300
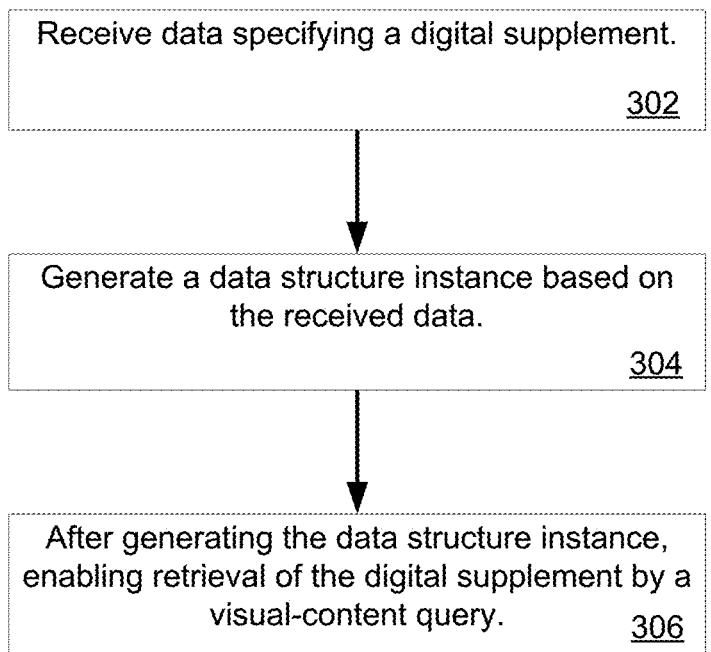
Receive data specifying a digital supplement.
302
Generate a data structure instance based on the received data.
304
After generating the data structure instance, enabling retrieval of the digital supplement by a visual-content query. 306
FIG. 3

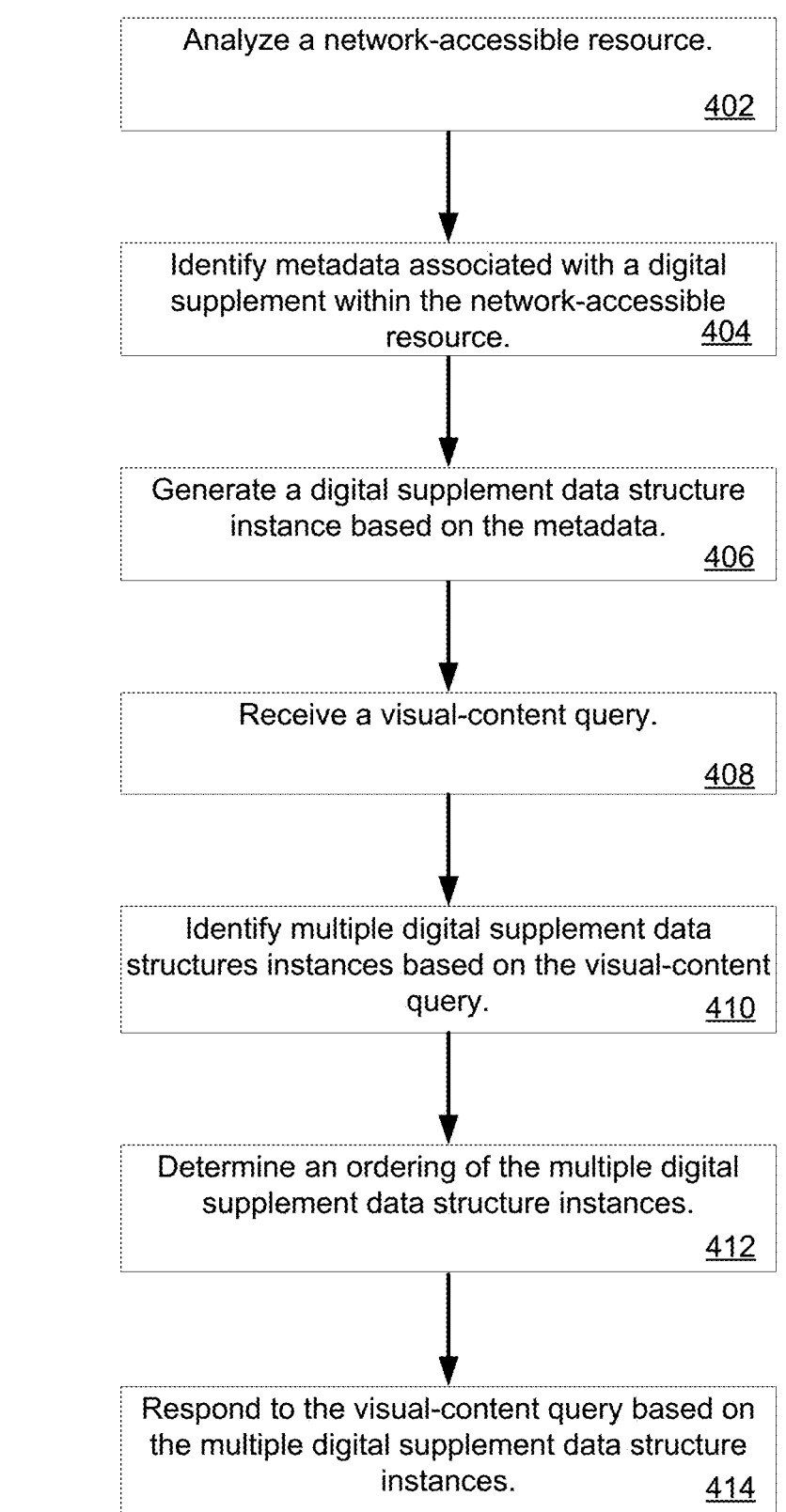

400

Analyze a network-accessible resource.

402

Identify metadata associated with a digital supplement within the network-accessible resource.    404

Generate a digital supplement data structure instance based on the metadata.

406

Receive a visual-content query.

408

Identify multiple digital supplement data structures instances based on the visual-content query.    410

Determine an ordering of the multiple digital supplement data structure instances.

412

Respond to the visual-content query based on the multiple digital supplement data structure instances.    414

Transmit a visual-content query that is based on an image to a server computing device.
502

Receive a response to the visual-content query that identifies a digital supplement.
504

Cause a user interface screen that includes information associated with the digital supplement to be displayed.    506

DIGITAL SUPPLEMENT ASSOCIATION AND RETRIEVAL FOR VISUAL SEARCH

CROSS-REFERENCE TO RELATED APPLICATIONS

This application is a continuation of, and claims priority to, U.S. patent application Ser. No. 18/189,805, filed on Mar. 24, 2023, entitled "DIGITAL SUPPLEMENT ASSOCIATION AND RETRIEVAL FOR VISUAL SEARCH", which is a continuation of U.S. patent application Ser. No. 16/949,890, filed on Nov. 19, 2020, entitled "DIGITAL SUPPLEMENT ASSOCIATION AND RETRIEVAL FOR VISUAL SEARCH", now U.S. Pat. No. 11,640,431, which claims priority to U.S. patent application Ser. No. 16/014,520, filed on Jun. 21, 2018, entitled "DIGITAL SUPPLEMENT ASSOCIATION AND RETRIEVAL FOR VISUAL SEARCH", now U.S. Pat. No. 10,878,037, the disclosures of which are incorporated by reference herein in their entirety.

BACKGROUND

Mobile computing devices, such as smartphones, often include cameras. These cameras can be used to capture images of entities in the environment around the computing device. Various types of content or experiences that relate to those entities may be available for users via the mobile computing device.

SUMMARY

This disclosure describes systems and methods for digital supplement association and retrieval for visual search. For example, systems and techniques described herein may be used to provide digital supplements, such as augmented reality (AR) content or experiences, that are responsive to a visual search. The visual search may for example be based on an image or an entity identified within an image. The digital supplement may, for example, include providing information or functionality associated with the image.

One aspect is a computer-implemented method that includes receiving data specifying a digital supplement, the data identifying a digital supplement and a supplement anchor for associating the digital supplement with visual content. The method also includes generating a data structure instance that specifies the digital supplement and the supplement anchor. The method further includes, after generating the data structure instance, enabling triggering of the digital supplement by an image based at least on storing the data structure instance in a database that includes a plurality of other data structure instances. Each of the other data structure instances specifies a digital supplement and one or more supplement anchors.

Another aspect is a computing device that includes at least one processor and memory storing instructions. The instructions, when executed by the at least one processor, cause the computing device to receive data specifying a digital supplement, the data identifying a digital supplement, a supplement anchor for associating the digital supplement with visual content, and context information. The instructions also cause the computing device to generate a data structure instance that specifies the digital supplement, the supplement anchor, and the context information. The instructions further cause the computing device to, after generating the data structure instance, enable triggering of the digital supplement by an image based at least on storing the data structure instance in a database that includes a plurality of other data structure instances. Each of the other data structure instances specifies a digital supplement and one or more supplement anchors.

Yet another aspect is a computer-implemented method that includes receiving a visual-content query from a computing device and identifying a supplement anchor based on the visual-content query. The method also includes generating an ordered list of digital supplements based on the identified supplement anchor and transmitting the ordered list to the client computing device.

The details of one or more implementations are set forth in the accompanying drawings and the description below. Other features will be apparent from the description and drawings, and from the claims.

BRIEF DESCRIPTION OF THE DRAWINGS

FIG. 3 is a diagram of an example method of enabling triggering of a digital supplement, in accordance with implementations described herein.

FIG. 4 is a diagram of an example method of enabling triggering of a digital supplement, in accordance with implementations described herein.

Figure 1:
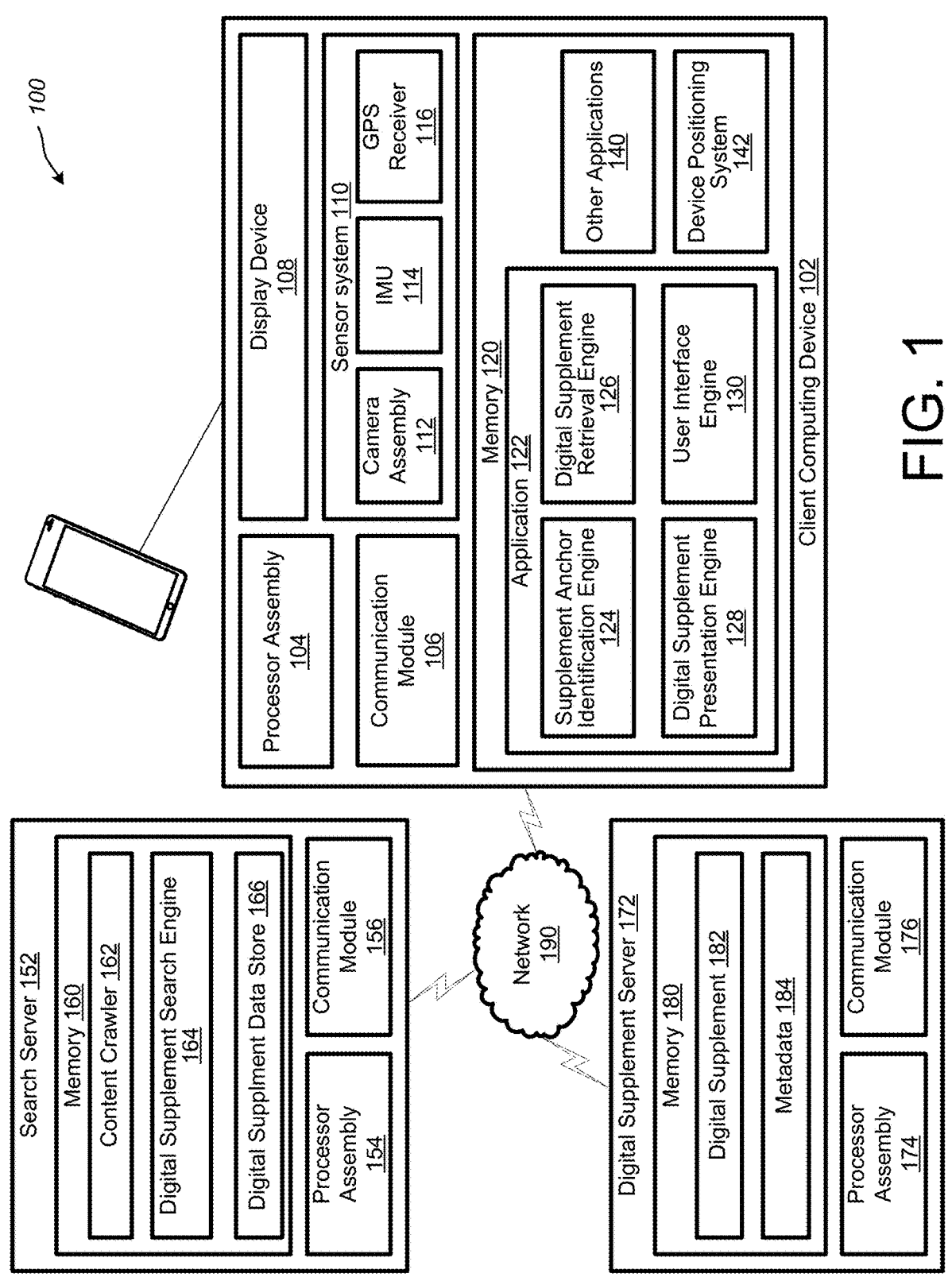
FIG. 1 is a block diagram illustrating a system according to an example implementation.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

DETAILED DESCRIPTION

The present disclosure describes technological improvements that simplify the identification and presentation of digital supplements based on visual content. Some implementations of technology described herein generate an index of digital supplements that are relevant to particular types of visual content and provide those digital supplements in response to a visual-content query received from a client computing device. This index can allow a user to access relevant digital supplements that are provided by network-accessible resources (e.g., web pages) disposed throughout the world.

For example, a client computing device, such as a smartphone, may capture an image of a supplement anchor, such as an entity. The client computing device may then transmit a visual-content query based on the image to a server computing device to retrieve digital supplements associated with the identified supplement anchor. In some implementations, the supplement anchor is based on the physical environment around the client computing device and the digital supplement is virtual content that may supplement a user's experience in the physical environment.

The visual-content query may include the image or data that is determined from the image (e.g., such as an indicator of the identified supplement anchor). An example of data determined from the image is text that is extracted from the image using, for example, optical character recognition. Other examples of data extracted from the image include values read from barcodes, QR codes, etc., in the image, identifiers or descriptions of entities, products, or entity types identified in the image.

The entities, products, or entity types may be identified in the image using, for example, a neural network system such as a convolutional neural network system. The identifiers or descriptions of entities, products, or entity types may include metadata or a reference to a record in a database that relates to an entity, product, or entity type. Non-limiting examples of the entities include buildings, works of art, products, books, posters, photographs, catalogs, signs, documents (e.g., business cards, receipts, coupons, catalogs), people, and body parts.

Various types of digital supplements may be available that are related to a supplement anchor. The digital supplement may be provided by a network-accessible resource, such as a web page that is available on the Internet. There is a need for a way to locate and provide these digital supplements in response to a visual-content query. Some implementations generate and maintain an index of digital supplements that are associated with entities for use in responding to visual content queries. The index may, for example, be populated by crawling network-accessible resources to determine whether the network-accessible resources include or provide any are digital supplements and to determine the supplement anchors associated with those digital supplements.

For example, the network-accessible resource may include metadata that identifies the supplement anchors (e.g., text, codes, entities, or types of entities) for which a digital supplement is associated. The metadata may be included by the network-accessible resource in response to a hypertext transfer protocol (HTTP) request. The metadata may be provided in various formats such as extensible markup language (XML), JavaScript Object Notation (JSON), or another format.

The metadata for a digital supplement may include one or more of the following: a type indicator, an anchor indicator, a name, a description, a snippet of the content (i.e., an excerpt or preview of a portion of the content), an associated image, a link such as a URL to the digital supplement, and an identifier of an application associated with the digital supplement. The metadata may also include information about a publisher of the digital supplement. For example, the metadata may include one or more of a publisher name, a publisher description, and an image or icon associated with the publisher. In some implementations, the metadata includes context information related to providing the digital supplement. For example, the metadata may also include conditions (e.g., geographic conditions, required applications) associated with providing or accessing the digital supplement.

The identified digital supplements may be added to an index that is stored in a memory. In at least some implementations, the associated supplement anchor for a digital supplement is used as a key to the index. The digital supplements may also be associated with various scores. For example, a digital supplement may be associated with a prestige score that is based on how many other links are found (e.g., while crawling network-accessible resources) that reference the digital supplement or the network-accessible resource associated with the digital supplement and the prestige of the network-accessible resources that provide those links. As another example, a digital supplement may be associated with one or more relevance scores that correspond to the relevance of the digital supplement (or the associated network-accessible resource) to a particular anchor. The relevance score may also be associated with a keyword or subject matter. The relevance score may be determined based on one or more of the content of the digital supplement, the content of the network-accessible resource, the content of sites that link to the network-accessible resource, and the contents (e.g., text) of links to the network-accessible resources.

FIG. 1 is a block diagram illustrating a system 100 according to an example implementation. The system 100 may associate digital supplement with entities or entity types and may retrieve digital supplements in response to visual searches. A visual search is a search based on visual-content. For example, a visual search may be performed based on a visual-content query. A visual-content query is a query based on an image or other visual-content. For example, a visual-content query may include an image. In some implementations, a visual-content query may include text or data that is based on an image. For example, the text or data may be generated by recognizing one or more entities in an image. Some visual-content queries do not include an image (e.g., a visual-content query may include only data or text generated from an image). In some implementations, the system 100 includes a client computing device 102, a search server 152, and a digital supplement server 172. Also shown is a network 190 over which the client computing device 102, the search server 152, and the digital supplement server 172 may communicate.

The client computing device 102 may include a processor assembly 104, a communication module 106, a sensor system 110, and a memory 120. The sensor system 110 may include various sensors, such as a camera assembly 112, an inertial motion unit (IMU) 114, and a global positioning system (GPS) receiver 116. Implementations of the sensor system 110 may also include other sensors, including, for example, a light sensor, an audio sensor, an image sensor, a distance and/or proximity sensor, a contact sensor such as a capacitive sensor, a timer, and/or other sensors and/or different combinations of sensors. In some implementations, the client computing device 102 is a mobile device (e.g., a smartphone).

The camera assembly 112 captures images or videos of the physical space around the client computing device 102. The camera assembly 112 may include one or more cameras. The camera assembly 112 may also include an infrared camera. Image captured with the camera assembly 112 may be used to identify to supplement anchors and to form visual content queries.

In some implementations, images captured with the camera assembly 112 may also be used to determine a location and orientation of the client computing device 102 within a physical space, such as an interior space, based on a representation of that physical space that is received from the memory 120 or an external computing device. In some implementations, the representation of a physical space may include visual features of the physical space (e.g., features extracted from images of the physical space). The representation may also include location-determination data associated with those features that can be used by a visual positioning system to determine location and/or position within the physical space based on one or more images of the physical space. The representation may also include a three-dimensional model of at least some structures within the physical space. In some implementations, the representation does not include three-dimensional models of the physical space.

The IMU 114 may detect motion, movement, and/or acceleration of the client computing device. The IMU 114 may include various different types of sensors such as, for example, an accelerometer, a gyroscope, a magnetometer, and other such sensors. An orientation of the client computing device 102 may be detected and tracked based on data provided by the IMU 114 or GPS receiver 116.

The GPS receiver 116 may receive signals emitted by GPS satellites. The signals include a time and position of the satellite. Based on receiving signals from several satellites (e.g., at least four), the GPS receiver 116 may determine a global position of the client computing device 102.

The memory 120 may include an application 122, other applications 140, and a device positioning system 142. The other applications 140 include any other applications that are installed or otherwise available for execution on the client computing device 102. In some implementations, the application 122 may cause one of the other applications 140 to be launched to provide a digital supplement. In some implementations, some digital supplements may only be available if the other applications 140 include a specific application associated with or required to provide the digital supplement.

The device positioning system 142 determines a position of the client computing device 102. The device positioning system 142 may use the sensor system 110 to determine a location and orientation of the client computing device 102 globally or within a physical space. In some implementations, the device positioning system 142 determines a location of the client computing device 102 based on, for example, a cellular triangulation.

In some implementations, the client computing device 102 may include a visual positioning system that compares images captured by the camera assembly 112 (or features extracted from those images) to a known arrangement of features within the representation of the physical space to determine the six degree-of-freedom pose (e.g., the location and orientation) of the client computing device 102 within a physical space.

The application 122 may include a supplement anchor identification engine 124, a digital supplement retrieval engine 126, a digital supplement presentation engine 128, and a user interface engine 130. Some implementations of the application 122 may include fewer, additional, or other components.

The supplement anchor identification engine 124 identifies supplement anchors based on, for example, images captured with the camera assembly 112. In some implementations, the supplement anchor identification engine 124 analyzes an image to identify text. The text may then be used to identify an anchor. For example, the text may be mapped to a node in a knowledge graph. For example, the text may be recognized as the name of an entity such as a person, place, product, building, artwork, movie, or other type of entity. In some implementations, the text may be recognized as a phrase that is commonly associated with a specific entity or as a phrase that describes a specific entity. For example, the text may then be recognized as an anchor associated with the specific entity.

In some implementations, the supplement anchor identification engine 124 identifies one or more codes, such as a barcode, QR code, or another type of code, within an image. The code may then be mapped to a supplement anchor.

The supplement anchor identification engine 124 may include a machine learning module that can recognize at least some types of entities within an image. For example, the machine learning module may include a neural network system. Neural networks are computational models used in machine learning and made up of nodes organized in layers with weighted connections. Training a neural network uses training examples, each example being an input and a desired output, to determine, over a series of iterative rounds, weight values for the connections between layers that increase the likelihood of the neural network providing the desired output for a given input. During each training round, the weights are adjusted to address incorrect output values. Once trained, the neural network can be used to predict an output based on provided input.

In some implementations, the neural network system includes a convolution neural network (CNN). A convolutional neural network (CNN) is a neural network in which at least one of the layers of the neural network is a convolutional layer. A convolutional layer is a layer in which the values of a layer are calculated based on applying a kernel function to a subset of the values of a previous layer. Training the neural network may involve adjusting weights of the kernel function based on the training examples. Typically, the same kernel function is used to calculate each value in a convolutional layer. Accordingly, there are far fewer weights that must be learned while training a convolutional layer than a fully-connected layer (e.g., a layer in which each value in a layer is a calculated as an independently adjusted weighted combination of each value in the previous layer) in a neural network. Because there are typically fewer weights in the convolutional layer, training and using a convolutional layer may require less memory, processor cycles, and time than would an equivalent fully-connected layer.

After the supplement anchor identification engine 124 recognizes an entity or entity type in an image, a textual description of the entity or entity type may be generated. Additionally, the entity or entity type may be mapped to a supplement anchor. In some implementations, a supplement anchor is associated with one or more digital supplements.

In some implementations, the supplement anchor identification engine 124 determines a confidence score for a recognized anchor. A higher confidence score may indicate that the content (e.g., image, extracted text, barcode, QR code) from an image is more likely to be associated with the determined anchor than if a lower confidence score is determined.

Although the example of FIG. 1 shows the supplement anchor identification engine 124 as a component of the application 122 on the client computing device 102, some implementations include a supplement anchor identification engine on the search server 152. For example, the client computing device 102 may send an image captured by the camera assembly 112 to the search server 152, which may then identify supplement anchors within the image.

In some implementations, the supplement anchor identification engine 124 identifies potential supplement anchors. For example, the supplement anchor identification engine 124 may identify (recognized) various entities within an image. Identifiers of the recognized entities may then be transmitted to the search server 152, which may determine if any of the entities are associated with any supplement anchors. In some implementations, the search server 152 may use the identified entities as contextual information even if the identified entities are not supplement anchors.

The digital supplement retrieval engine 126 retrieves digital supplements. For example, the digital supplement retrieval engine 126 may retrieve digital supplements associated with supplement anchors identified by the supplement anchor identification engine 124. In some implementations, the digital supplement retrieval engine 126 retrieves a digital supplement from the search server 152 or the digital supplement server 172.

For example, after supplement anchors are identified, the digital supplement retrieval engine 126 may retrieve one or more digital supplements that are associated with the identified supplement anchors. The digital supplement retrieval engine 126 may generate a visual-content query that includes the image (or identifiers of supplement anchors or entities within the image) and transmit the visual-content query to the search server 152. The visual-content query may also include contextual information such as the location of the client computing device 102. In some implementations, data relating to the digital supplements such as a name, an image, or a description is retrieved and presented to a user (e.g., by the user interface engine 130). If multiple digital supplements are presented, a user may select one of the digital supplements via a user interface generated by the user interface engine 130.

The digital supplement presentation engine 128 presents or causes digital supplements to be presented on the client computing device 102. In some implementations, the digital supplement presentation engine 128 causes the client computing device to initiate one of the other applications 140. In some implementation, the digital supplement presentation engine 128 causes information or content to be displayed. For example, the digital supplement presentation engine 128 may cause the user interface engine 130 to generate a user interface that includes information or content from a digital supplement to be displayed by the client computing device 102. In some implementations, the digital supplement presentation engine 128 is triggered by the digital supplement retrieval engine 126 retrieving a digital supplement. The digital supplement presentation engine 128 may then trigger the display device 108 to display content associated with a digital supplement. In some implementations, the digital supplement presentation engine 128 causes a digital supplement to be displayed at a different time than when the digital supplement retrieval engine 126 retrieves the digital supplement. For example, a digital supplement may be retrieved in response to a visual-content query at a first time and the digital supplement may be presented at a second time. For example, a digital supplement may be retrieved in response to a visual-content query based on an image of a home furnishing or furniture from a catalog or store at a first time (e.g., while the user is looking through a catalog or is at a store). A digital supplement that includes AR content of the home furnishing or furniture may be presented at a second time (e.g., while the user is in a room in which the home furnishing or furniture may be placed).

The user interface engine 130 generates user interfaces. The user interface engine 130 may also cause the client computing device 102 to display the generated user interfaces. The generated user interfaces may, for example, display information or content from a digital supplement. In some implementations, the user interface engine 130 generates a user interface includes multiple user-actuatable controls that are each associated with a digital supplement. For example, a user may actuate one of the user-actuatable controls (e.g., by touching the control on a touchscreen, clicking on the control using a mouse or another input device, or otherwise actuating the control).

The search server 152 is a computing device. The search server 152 may respond to search requests such as visual-content queries. The response may include one or more digital supplements that are potentially relevant to the visual-content query. In some implementations, the search server 152 includes memory 160, a processor assembly 154, and a communication module 156. The memory 160 may include a content crawler 162, a digital supplement search engine 164, and a digital supplement data store 166.

The content crawler 162 may crawl network-accessible resources to identify digital supplements. For example, the content crawler 162 may access web pages that are accessible via the Internet, such as web pages provided by the digital supplement server 172. Crawling a network-accessible resource may include requesting the resource from a web server and parsing at least a portion of the resource. Digital supplements may be identified based on metadata provided by the network-accessible resource, such as XML or JSON data that provides information about a digital supplement. In some implementations, the crawler identifies network-accessible resources based on extracting links from previously crawled network-accessible resources. The content crawler 162 may also identify network-accessible resources to crawl based on receiving input submitted by a user. For example, a user may submit a URL (or other information) to a network-accessible resource that includes a digital supplement via a web form or application programming interface (API). In some implementations, the content crawler 162 generates an index of the identified digital supplement. The content crawler 162 may also generate scores associated with the digital supplements, such as relevance scores or popularity (prestige) scores.

The digital supplement search engine 164 receives search queries and generates responses that may include one or more potentially relevant digital supplement. For example, the digital supplement search engine 164 may receive a visual-content query from the client computing device 102. The visual-content query may include an image. The digital supplement search engine 164 may identify supplement anchors in the image and, based on the identified supplement anchor, identify related or potentially relevant digital supplements. The digital supplement search engine 164 may transmit to the client computing device 102 a response that includes the digital supplement or information that can be used to access the digital supplement. In some implementations, the digital supplement search engine 164 may return information associated with multiple digital supplements. For example, a list of digital supplements may be included in a response to the query. The list may be ordered based on relevance to the supplement anchor, popularity, or other properties of the digital supplement.

The visual-content queries may, for example, include images captured by the camera assembly 112 or text or other data associated with images captured by the camera assembly 112. The visual-content queries may also include other information such as the location of the client computing device 102 or an identifier of a user of the client computing device 102. In some implementations, the search server 152 may determine a probably location of the client computing device 102 from the user identifier (e.g., if the user has enabled a location service on the client computing device 102 that associates information about a user's location with the user's account).

The digital supplement data store 166 stores information about digital supplements. In some implementations, the digital supplement data store 166 includes an index of digital supplements. For example, the index may be generated by the content crawler 162. The digital supplement search engine 164 may use the index to respond to search queries.

The digital supplement server 172 is a computing device. The digital supplement server 172 provides digital supplements. In some implementations, the digital supplement server 172 includes memory 180, a processor assembly 174, and a communication module 176. The memory 180 may include a digital supplement 182 and metadata 184. In some implementations, the memory 180 may also include other network-accessible resources such as web pages that are not necessarily digital supplements. For example, the memory 180 may store a web page that includes metadata to provide details about one or more digital supplements and how to access those digital supplements. Additionally, the memory 180 may include a resource serving engine such as a web server that, for example, responds to requests, such as HTTP requests, with network-accessible resources such as web pages and digital supplements.

The digital supplement 182 is content of any type that can be provided as a supplement to something in the physical environment around a user. The digital supplement 182 may also include content of any type that can supplement a stored image (e.g., of a previous physical environment around a user). For example, the digital supplement may be associated with a supplement anchor, such as an image, an object or product identified in the image, or a location. The digital supplement 182 may include one or more images, audio content, textual data, videos, games, data files, applications, or structured text documents. Examples of structured text documents include hypertext markup language (HTML) documents, XML documents, and other types of structured text documents.

The digital supplement 182 may cause an application to be launched and may define parameters for that application. The digital supplement 182 may also cause a request to be transmitted to a server (e.g., an HTTP request) and may define parameters for that request. In some implementations, the digital supplement 182 initiates as a workflow for completing an activity, such as a workflow for completing a purchase. For example, the digital supplement 182 may transmit an HTTP request to a server that adds a particular product to a user's shopping cart, adds a coupon code, and retrieves a purchase confirmation page.

The metadata 184 is data that describes a digital supplement. The metadata 184 may describe one or digital supplements that are provided by the digital supplement server 172 or that are provided elsewhere. The metadata 184 for a digital supplement may include one or more of the following: a type indicator, an anchor indicator, a name, a description, a preview snippet or excerpt, an associated image, a link such as a URL to the digital supplement, and an identifier of an application associated with the digital supplement. The metadata may also include information about a publisher of the digital supplement, such as a publisher name, a publisher description, and an image or icon associated with the publisher. In some implementations, the metadata also includes context information about the digital supplement or that must be satisfied to provide the digital supplement. For example, the metadata may include conditions (e.g., geographic conditions, client computing devices requirements, required applications) that must be met to access the digital supplement. Example context information includes locations, entities identified within an image, or multiple entities identified within an image (e.g., some digital supplements may require a combination of entities to be recognized within the image). The recognized entities may be supplement anchors. In some implementations, the recognized entities are not supplement anchors but instead provide contextual information. The metadata 184 may also include supplement anchors (e.g., text, codes, entities, or types of entities) that are associated with a digital supplement.

The metadata 184 may be stored in various formats. In some implementations, the metadata 184 is stored in database. The metadata 184 may also be stored as an XML file, a JSON file or another format file. In some implementations, the digital supplement server 172 retrieves the metadata 184 from a database and formats the metadata 184 as XML, JSON, or otherwise to provide a response to a request from a client or the search server 152. For example, the search server 152 may access the metadata 184 to generate data stored in the digital supplement data store 166 and used to respond to search requests from the client computing device 102.

The communication module 106 includes one or more devices for communicating with other computing devices, such as the search server 152 or the digital supplement server 172. The communication module 106 may communicate via wireless or wired networks, such as the network 190. The communication module 156 of the search server 152 and the communication module 176 of the digital supplement server 172 may be similar to the communication module 106.

The display device 108 may, for example, include an LCD (liquid crystal display) screen, an LED (light emitting diode) screen, an OLED (organic light emitting diode) screen, a touchscreen, or any other screen or display for displaying images or information to a user. In some implementations, the display device 108 includes a light projector arranged to project light onto a portion of a user's eye.

The memory 120 can include one or more non-transitory computer-readable storage media. The memory 120 may store instructions and data that are usable by the client computing device 102 to implement the technologies described herein, such as to generate visual-content queries based on captured images, transmit visual-content queries, receive responses to the visual-content queries, and present a digital supplement identified in a response to a visual-content query. The memory 160 of the search server 152 and the memory 180 of the digital supplement server 172 may be similar to the memory 120 and may store data instructions that are usable to implement the technology of the search server 152 and the digital supplement server 172, respectively.

The processor assembly 104 includes one or more devices that are capable of executing instructions, such as instructions stored by the memory 120, to perform various tasks associated with digital supplement association and retrieval for visual search. For example, the processor assembly 104 may include a central processing unit (CPU) and/or a graphics processor unit (GPU). For example, if a GPU is present, some image/video rendering tasks, such as generating and displaying a user interface or displaying portions of a digital supplement may be offloaded from the CPU to the GPU. In some implementations, some image recognition tasks may also be offloaded from the CPU to the GPU.

Although FIG. 1 does not show it, some implementations include a head-mounted display device (HMD). The HMD may be a separate device from the client computing device 102 or the client computing device 102 may include the HMD. In some implementations, the client computing device 102 communicates with the HMD via a cable. For example, the client computing device 102 may transmit video signals and/or audio signals to the HMD for display for the user, and the HMD may transmit motion, position, and/or orientation information to the client computing device 102.

The client computing device 102 may also include various user input components (not shown) such as a controller that communicates with the client computing device 102 using a wireless communications protocol. In some implementations, the client computing device 102 may communicate via a wired connection (e.g., a Universal Serial Bus (USB) cable) or via a wireless communication protocol (e.g., any WiFi protocol, any BlueTooth protocol, Zigbee, etc.) with a HMD (not shown). In some implementations, the client computing device 102 is a component of the HMD and may be contained within a housing of the HMD.

The network 190 may be the Internet, a local area network (LAN), a wireless local area network (WLAN), and/or any other network. The client computing device 102, for example, may receive the audio/video signals, which may be provided as part of a digital supplement in an illustrative example implementation, via the network.

Figure 2:
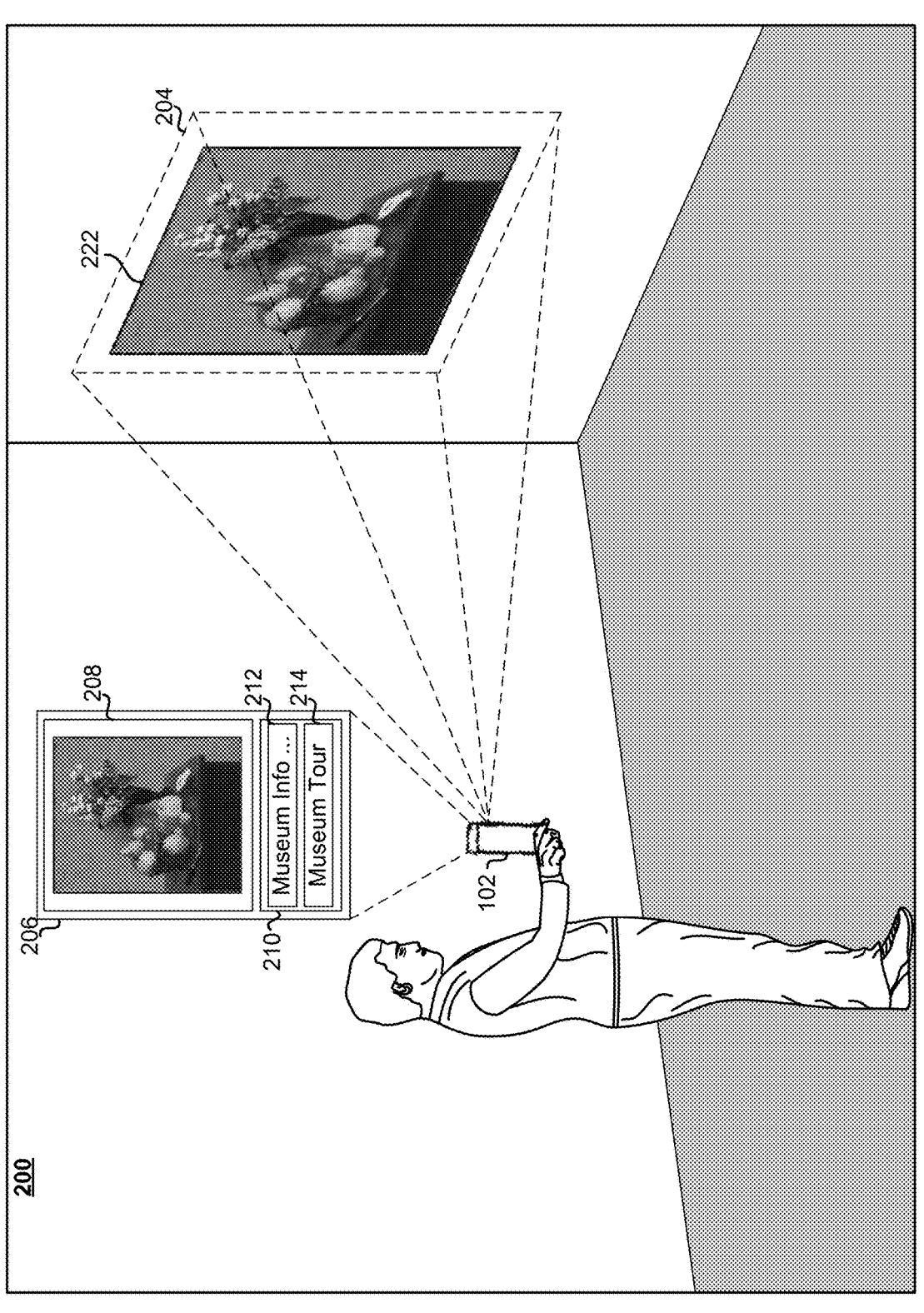
FIG. 2 is a third person view of an example physical space in which an embodiment of the client computing device of FIG. 1 is accessing digital supplements.

FIG. 2 is a third person view of an example physical space 200 in which an embodiment of the client computing device 102 is accessing digital supplements. In this example, the physical space 200 includes an object 222. Here, the object 222 is an artwork on a wall of the physical space 200. The object 222 is contained within the field of view 204 of the camera assembly 112 of the client computing device 102.

An example user interface screen 206 is also shown. The user interface screen 206 may, for example, be generated by the user interface engine 130 of the client computing device 102. The user interface screen 206 includes an image display panel 208, and a digital supplement selection panel 210. The image display panel 208 shows an image. For example, the image display panel 208 may show an image corresponding to a real-time feed from the camera assembly 112 of the client computing device 102. In some implementations, the image display panel 208 shows a previously captured image or an image that has been retrieved from the memory 120 of the client computing device 102.

In some implementations, the user interface screen 206 is displayed to the user on a display device of the client computing device 102. In some implementations, the user interface screen 206 may be overlaid on an image (or video feed being captured by the camera of the computing device) of the physical space so. Additionally, the user interface screen 206 may be displayed as AR content over the user's field of view using an HMD worn by the user.

The image display panel 208 may also include annotations or user interface elements that may relate to the image. For example, the image display panel 208 may include an indicator that an object in the image (e.g., the object 222) has been recognized as a supplement anchor. The indicator may include a user-actuatable control to access or view information about digital supplements associated with the identified supplement anchor. In some situations, the image displayed in the image display panel 208 may include multiple objects that are recognized as supplement anchors, and the image display panel 208 may include multiple annotations that overlay the image to identify those supplement anchors.

The supplement anchors may be recognized by a supplement anchor identification engine of the client computing device 102. In some implementations, the supplement anchors are identified by transmitting an image to the search server 152. The search server 152 may then analyze the image and identify supplement anchors in the image. In some implementations, the search server 152 may transmit one or more of the locations (e.g., image coordinates) or the dimensions of any identified objects that are associated with supplement anchors to the client computing device 102. The client computing device 102 may then update the user interface screen to show annotations that identify the supplement anchors (or associated objects) in the image. In some implementations, the client computing device 102 may track the locations of the supplement anchors (or associated objects) in a video stream (e.g., a sequence sequentially captured images) captured by the camera assembly 112 (e.g., the supplement anchor identification engine 124 may track supplement anchors identified by the search server 152).

The digital supplement selection panel 210 allows a user to select a digital supplement for presentation. For example, the digital supplement selection panel 210 may include a menu that includes user-actuatable controls that are each associated with a digital supplement. In this example, the digital supplement selection panel 210 includes a user-actuatable control 212 and a user-actuatable control 214, which each include information about the associated digital supplement. For example, the user-actuatable controls may display one or more of a name (or title), a brief description, and an image associated with the digital supplements, which may be received from the search server 152. Upon actuation of the user-actuatable control 212 or the user-actuatable control 214, the content of the associated digital supplement may be presented to the user. Presenting the digital supplement to the user may include causing the client computing device 102 to display a user interface screen that includes images, videos, text, other content, or a combination thereof from the digital supplement. In some implementations, the digital supplement content is displayed as an overlay on the image display panel 208 over an image or camera feed. The digital supplement content may be three-dimensional augmented reality content.

In some implementations, presenting a digital supplement includes activating an application that is installed on the client computing device 102 (e.g., one of the other applications 140). Presenting the digital supplement may also include transmitting a request to a URL associated with the digital supplement. The request may include parameters associated with the digital supplement, such as an identifier of a product or object identified within the image. In some implementations, the image (or other content) from the visual-content query is passed a parameter with the request. The image may also be provided via an API associated with a digital supplement server 172. In some implementations, the client computing device 102 transmits the image to the digital supplement server 172. In some implementations, the search server 152 may transmit the image to the digital supplement server 172. For example, responsive to a user selecting a digital supplement, the client computing device 102 may transmit an indicator of the selection to the search server 152 and the search server 152 may then transmit the image to a corresponding digital supplement server. The client computing device 102 may also transmit a URL to a location on the search server 152 that the digital supplement server 172 can use to access the image. Beneficially, these implementations may reduce the amount of data the client computing device needs to transmit.

The digital supplement associated with the user-actuatable control 212 may cause information about the object 222, such as information from a museum, to be displayed. The digital supplement associated with the user-actuatable control 214 may cause information related to a museum tour to be displayed. For example, presentation of the digital supplement may cause a stop on a museum tour to be marked as completed and information about a next stop to be displayed.

FIG. 3 is a diagram of an example method 300 of enabling triggering of a digital supplement, in accordance with implementations described herein. This method 300 may, for example, be performed by the content crawler 162 of the search server 152 to allow a user to access a digital supplement based on a visual-content query.

At operation 302, data specifying a digital supplement is received. The data may identify a digital supplement and situations in which the digital supplement should be provided. The data specifying a digital supplement may be received in various ways. For example, the data specifying the digital supplement may be received from a network-accessible resource such as a web page that includes metadata about the digital supplement. The data specifying a digital supplement may also be received via an API or form provided by, for example, the search server 152. The data specifying a digital supplement may also be received from a memory location or data store.

The data about the digital supplement may include access data that is usable by a client computing device to access the digital supplement. For example, the access data may include a URL of the digital supplement and parameters to pass to that URL. The access data may also include an application identifier and parameters for the application. The data about the digital supplement may also include descriptive data about the digital supplement. The descriptive data may be usable by a client computing device to present information about a digital supplement to a user (e.g., on a menu in which the user may select a digital supplement). The descriptive data may include, for example, a name (or title, a description, a publisher name, and an image. The data about the digital supplement may also include identifiers of supplement anchors.

At operation 304, a data structure instance based on the received data is generated. The data structure may, for example, be a record in a database. The database may be a relational database and the data structure instances may be linked (e.g., via a foreign key) with one or more records associated with supplement anchors.

At operation 306, after generating the data structure instance, retrieval of the digital supplement by a visual-content query is enabled. For example, a database field associated with the data structure instance may be set to active so that the digital supplement search engine 164 can access and return the associated digital supplement. In some implementations, triggering of the digital supplement may include saving or committing a database record. In some implementations, enabling of retrieval of the digital supplement includes enabling triggering of the digital supplement by a client computing device. For example, after the instance is generated, the digital supplement may be returned to a client computing device in response to a search and activated or presented by the client computing device.

FIG. 4 is a diagram of an example method 400 of enabling triggering of a digital supplement, in accordance with implementations described herein. This method 400 may, for example, be performed by the content crawler 162 of the search server 152 to allow a user to access a digital supplement based on a visual-content query.

At operation 402, a network-accessible resource is analyzed. In some implementations, the network accessible resource is a web page served by, for example, the digital supplement server 172. In some implementations, a set of network-accessible resources are analyzed. The set of network-accessible resources may be generated based on submissions via a form or API. In some implementations, the set of network-accessible resources may be generated by crawling other network-accessible resources to identify URLs. This crawling process may be performed recursively.

At operation 404, metadata associated with a digital supplement within the network-accessible resource is identified. In some implementations, the network-accessible resource may include an indicator of metadata associated with a digital supplement. For example, the network-accessible resource may include a tag that identifies a portion of the network-accessible resource that includes the metadata. The tag may be an XML tag with a specific type or attribute. The tag may be an HTML tag, such as a script tag that includes a JSON data structure containing metadata.

At operation 406, a digital supplement data structure instance based on the metadata is generated. The operation 406 may be similar to the operation 304.

At operation 408, a visual-content query is received. The visual-content query may for example be sent by a client computing device such as the client computing device 102. In some implementations, the visual-content query includes an image. The visual-content query may also include textual data that describes an image. For example, the textual data may include identifiers of supplement anchors within an image captured by a camera assembly of the client computing device. In some implementations, the visual-content query also includes other information, such as a location of the client computing device or an identifier of a user account associated with the client computing device.

At operation 410, multiple digital supplement data structures instances are identified based on the visual-content query. In some implementations, supplement anchors are identified within an image provided in the visual-content query. The supplement anchors may then be used to query an index or a database for relevant digital supplements. In some implementations, other data provided with the query may be used to identify the digital supplements too, such as a location of the client computing device or information associated with a user account. In some implementations, multiple supplement anchors are used to identify relevant supplement anchors.

At operation 412, an ordering of the multiple digital supplement data structure instances is determined. The ordering may be based on various scores associated with the digital supplement or the relevance of the digital supplement to the visual-content query. In some implementations, a relevance score that corresponds to the relevance of a digital supplement to the visual-content query is used to order the multiple digital supplement data structure instances.

The relevance score may be determined from multiple factors, such as one or more of the content of the digital supplement, the content of network-accessible resources that link to the digital supplement (or a network-accessible resource associated with the digital supplement), the link text or content near the links to the digital supplement on other network-accessible resources.

The scores may also be based on popularity metrics. A prestige metric is an example of a popularity metric. The prestige metric may be based on a combination of how many other network resources link to the digital supplement and the prestige score of those other network-accessible resources. In some implementations, the popularity score may be based on how frequently the digital resource is or has been selected. In some implementations, the popularity score may correspond to how frequently the digital resource is selected for the visual-content query.

The scores may be determined or may be retrieved from a data store or an API. In some implementations, an API is accessed to retrieve scores for a digital supplement. For example, the scores may be retrieved from a search engine that has determined a relevance and/or popularity for a digital resource with respect to search terms that are based on the supplement anchors.

The multiple digital supplement data structures may also be ordered based on frequency of use by a specific user (e.g., the user of the client computing device) or recency of use by the specific user. In some implementations, the multiple digital supplement data structures are ordered randomly.

At operation 414, the visual-content query is responded to based on the multiple digital supplement data structure instances. For example, information associated with the multiple digital supplement data structure instances may be transmitted to the client computing device in the order determined at operation 412. In some implementations, the information includes descriptive data that can be shown in a menu or another type of user interface that is configured to receive a user selection of a digital supplement. The information may also include access data that can be used by the client computing device to access or present the digital supplement.

Figure 5:
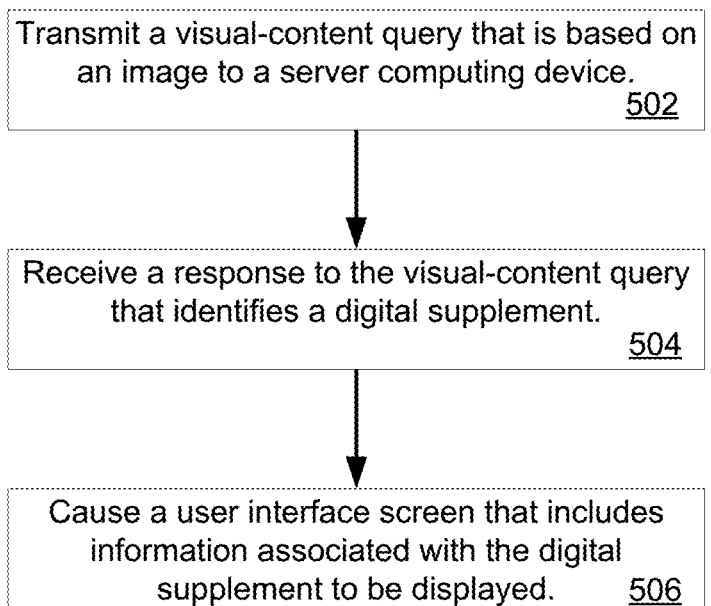
FIG. 5 is a diagram of an example method of searching for and presenting a digital supplement, in accordance with implementations described herein.

FIG. 5 is a diagram of an example method 500 of searching for and presenting a digital supplement, in accordance with implementations described herein. This method 500 may, for example, be performed by the application 122 of the client computing device 102 to identify and access a digital supplement based on a visual-content query.

At operation 502, a visual-content query that is based on an image is transmitted to a server computing device (e.g., the search server 152). For example, an image may be captured with the camera assembly 112 of the client computing device 102. The image may also be a stored image such as an image that was previously captured by the camera assembly 112. In some implementations, the visual-content query includes only the image. In some implementations, the visual-content query includes additional information. For example, the visual-content query may include information such as a location of the client computing device 102 or an identifier of an account associated with a user of the client computing device 102. The application 122 may also identify anchors in an image (e.g., with the supplement anchor identification engine 124). The visual-content query may include identifiers (e.g., textual, numeric or other types of identifiers) of the identified anchors. In at least some implementations, the visual-content query does not include an image.

In some implementations, transmitting the visual-content query to the server includes calling an API. In some implementations, transmitting the visual-content query to the server includes calling an API provided by the server. In some implementations, transmitting the visual-content query to the server includes submitting a form using the HTTP protocol (e.g., submitting a GET or POST request).

At operation 504, a response to the visual-content query that identifies a digital supplement is received. The response may be received via the network 190 from the search server 152. The response may include one or more digital supplements that were identified based on the visual-content query by the search server 152. For example, the response may include an array of data associated with the digital supplements. In some implementations, the data associated with the digital supplements may include descriptive data that can be used to present digital supplement options for a user to select. For example, the descriptive data may include a name, a short description, a publisher name, and an image. The data may also include access data, such as a URL and parameters to include with a request via the URL or an application name and associated parameters. The data may also include the location, coordinates, or dimensions of supplement anchors in an image transmitted with the visual-content query (e.g., if the supplement anchors are identified by the search server 152).

At operation 506, a user interface screen that includes information associated with the digital supplement is displayed. In some implementations, the user interface screen includes annotations that overlay the identified supplement anchors (e.g., based on the provided coordinates). The annotations may provide information about the object in the image associated with the identified supplement anchors. The annotations may include user-actuatable controls that can be actuated to present or activate a digital supplement. The user interface screen may also include a digital supplement selection panel that can be used to select from multiple digital supplements that are identified in the response received at operation 504. In some implementations, the user interface screen may be generated a by a web browser that opens a URL specified by the digital supplement. The user interface screen may also be generated by another application that is launched to provide the digital supplement.

Figure 6:
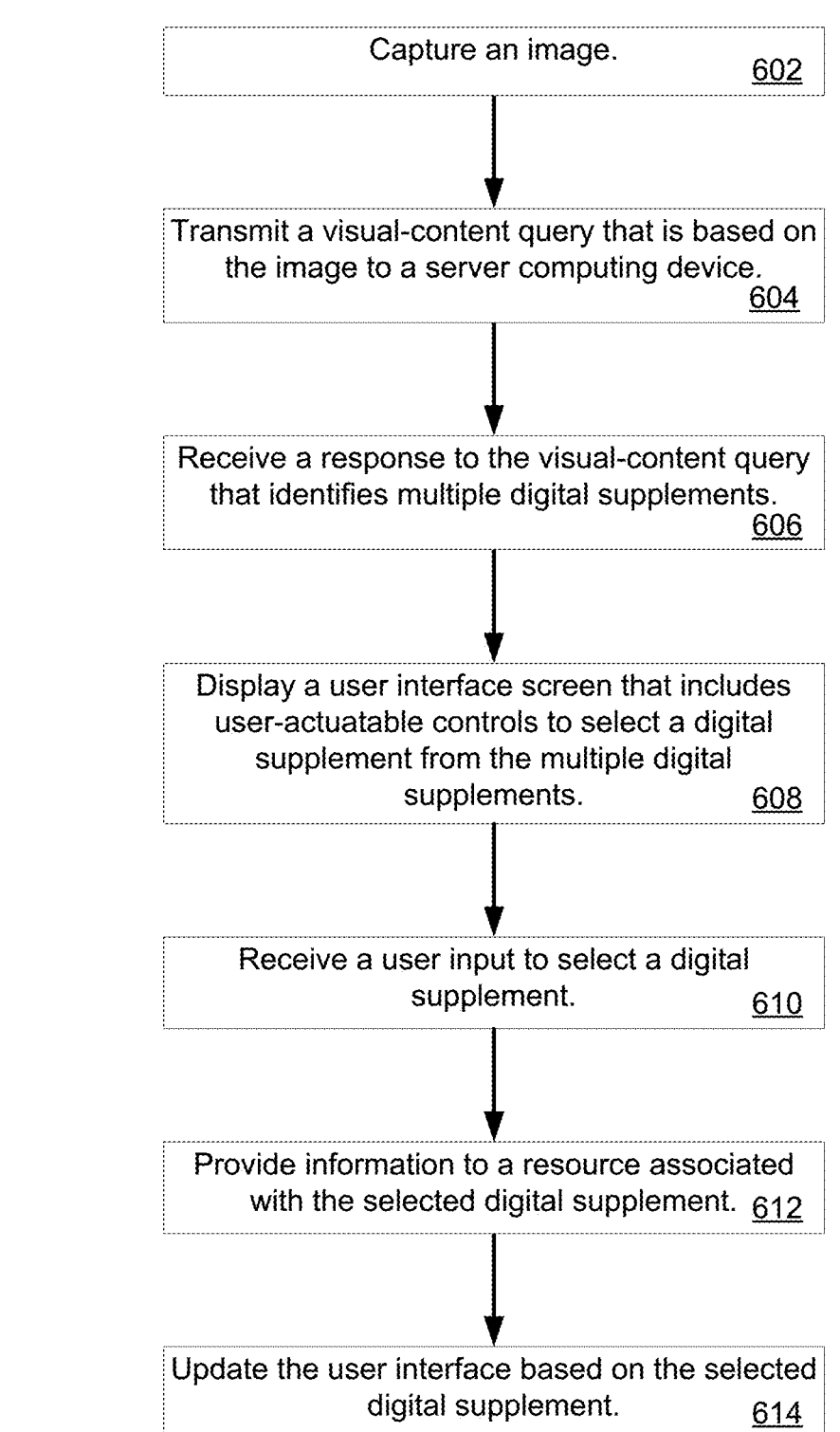
FIG. 6 is a diagram of an example method of identifying and presenting a digital supplement based on an image, in accordance with implementations described herein.

FIG. 6 is a diagram of an example method 600 of identifying and presenting a digital supplement based on an image, in accordance with implementations described herein. This method 600 may, for example, be performed by the application 122 of the client computing device 102 to identify and access a digital supplement based on a visual-content query.

At operation 602, an image is captured. For example, the image may be captured by the camera assembly 112 of the client computing device 102. In some implementations, a sequence of images (i.e., a video) may be captured by the camera assembly 112.

At operation 604, a visual-content query that is based on the image is transmitted to a server computing device such as the search server 152. The operation 604 may be similar to the operation 502. In implementations, where a sequence of images are captured the visual-content query may include multiple images or a sequence of images. In some implementations, the sequence of images may be streamed to the server computing device.

At operation 606, a response to the visual-content query that identifies multiple digital supplements is received. The operation 606 may be similar to the previously described operation 504.

At operation 608, a user interface screen that includes user-actuatable controls to select a digital supplement from the multiple digital supplements is displayed. For example, a digital supplement selection panel may be displayed. The digital supplement selection panel may include multiple user-actuatable controls each of which is associated with one of the multiple digital supplements identified in the response. The digital supplement selection may arrange the user-actuatable controls based on an ordering or ranking of the digital supplements provided by the server computing device. The digital supplement selection panel may arrange the user-actuatable controls vertically, horizontally, or otherwise. The user-actuatable controls may be associated with or include information about the associated digital supplement that user can consider when deciding whether to select the digital supplement. For example, the information that is displayed may include one or more of a name, a description, an image, and a publisher name for a digital supplement.

At operation 610, a user input to select a digital supplement is received. The user input may be a click using a mouse or other device. The user input may also be a touch input from a stylus or finger. Another example of a user input is a near-touch input (e.g., holding a finger or pointing device proximate to the screen). In some implementations, the user input can also include a hand gesture, a head motion, an action with an eye, or a spoken input.

At operation 612, information is provided to a resource associated with the selected digital supplement. For example, information about a user of the client computing device may be transmitted to a server that provides the digital supplement (if permission to provide the information has been provided). The information may also be provided to an application that provides the digital supplement. Various types of information may be provided. For example, the information may include user information such as a user name, user preferences, or a location.

The information may also include information related to the visual-content query such as an image or sequence of images. The information may also include identifiers and/or positions of one or more supplement anchors in the image. This information may be used to provide the digital supplement to the user. For example, AR content of a digital supplement may be sized and positioned based on the image.

The information may be transmitted directly to the resource associated with the digital supplement (e.g., the digital supplement server 172) by the client computing device 102. In some implementations, the information is provided to the resource associated with the digital supplement by the search server 152 (e.g., so the client computing device does not need to transmit as much data). In at least some of these implementations, the client computing device 102 may transmit selection information to the search server 152 that identifies a selected digital supplement. Upon receiving the selection and verifying that the user has authorized the sharing of the information, the search server 152 may then transmit information to the resource that provides the digital supplement. The client computing device 102 may also prompt the user to permit sharing the information. In some implementations, the search server 152 may determine the information to transmit to the resource based on a digital supplement data structure instance (which may be based on metadata associated with the digital supplement).

At operation 614, the user interface is updated based on the selected digital supplement. The operation 614 may be similar to the operation 506.

Figures 7A, 7B, 7C:
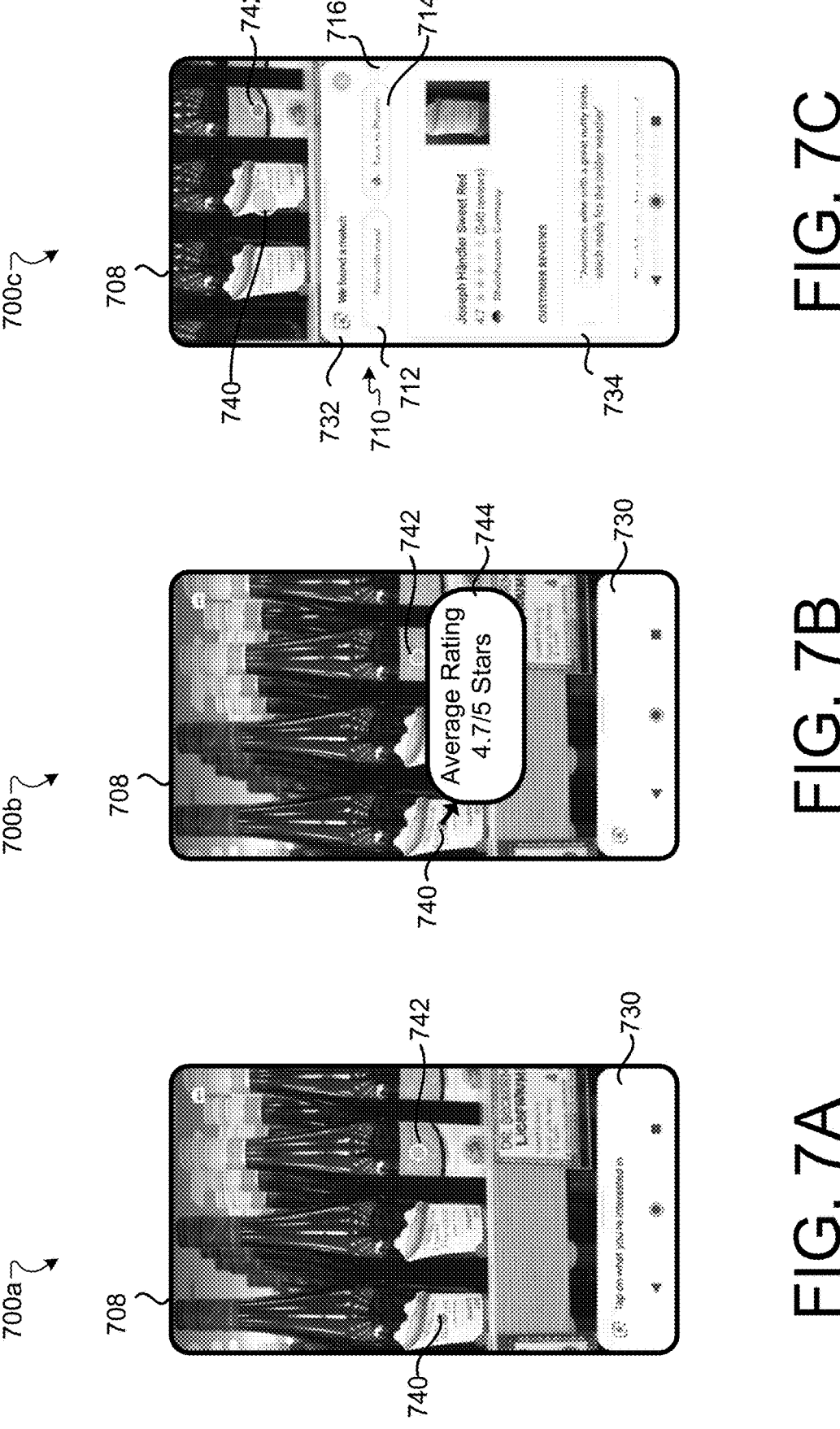
FIGS. 7A-7C are schematic diagrams of user interface screens displayed by embodiments of the client computing device of FIG. 1 to conduct a visual-content search and displaying a digital supplement.

FIGS. 7A-7C are schematic diagrams of user interface screens displayed by embodiments of the client computing device 102 to conduct a visual-content search and display a digital supplement. In FIG. 7A a user interface screen 700a is shown. The user interface screen 700a includes an image display panel 708 and an information panel 730. In this example, the image display panel 708 is displaying an image of a shelf full of wine bottles (e.g., as you might find in a store). The image display panel 708 also includes an indicator 740 and an indicator 742. Each of these indicators indicate that the wine bottle shown in the image beneath the indicator has been recognized as a supplement anchor (e.g., in this case as a recognized product). The indicator 740 and the indicator 742 are examples of user-actuatable controls. Within the information panel 730 instructions are provided to "Tap on what you're interested in."

In FIG. 7B, a user interface screen 700b is shown after a user has actuated the indicator 740. After actuation, an annotation 744 from a digital supplement is displayed. The annotation 744 includes information on the rating of the wine, which may help the user select a bottle of wine to purchase.

In FIG. 7C, another user interface screen 700c is shown after a user has actuated the indicator 740. The user interface screen 700c may be shown instead of or in addition to the user interface screen 700b is shown (e.g., after actuation of the annotation 744 or if the user swipes up on the information panel 730 in FIG. 7B). In FIG. 7C, an expanded information panel 732 is shown. The expanded information panel 732 takes up more of the user interface screen 700c than the information panel 730 took up in FIGS. 7A and 7B.

The expanded information panel 732 includes a digital supplement selection panel 710 and a digital supplement content display panel 734. The digital supplement selection panel 710 includes a user-actuatable control 712, a user-actuatable control 714, and a user-actuatable control 716 (which is only partially visible). In some implementations, when a user swipes on the digital supplement selection panel 710 additional user-actuatable controls may be displayed. The user-actuatable controls of the digital supplement selection panel 710 may be arranged in a ranked order. The user-actuatable control 712 is associated with a digital supplement for meal pairing. Upon actuation of the user-actuatable control 712, a digital supplement that displays food and meal pairing information for the selected wine may be displayed. The user-actuatable control 714 is associated with a digital supplement that saves a photo. Upon actuation, an application that saves photos may be activated and provided with the image. Additional information may be saved along with the photo such as the identified supplement anchors.

The digital supplement content display panel 734 may display content from a digital supplement. The digital supplement content display panel 734 may display a default digital supplement or a highest-ranked digital supplement that is associated with the identified supplement anchor. In this example, the digital supplement content display panel 734 includes product information about the product associated with the selected supplement anchor. In this case, a wine name, rating, location of origin, image, and comments are provided.

Figures 8A, 8B, 8C:
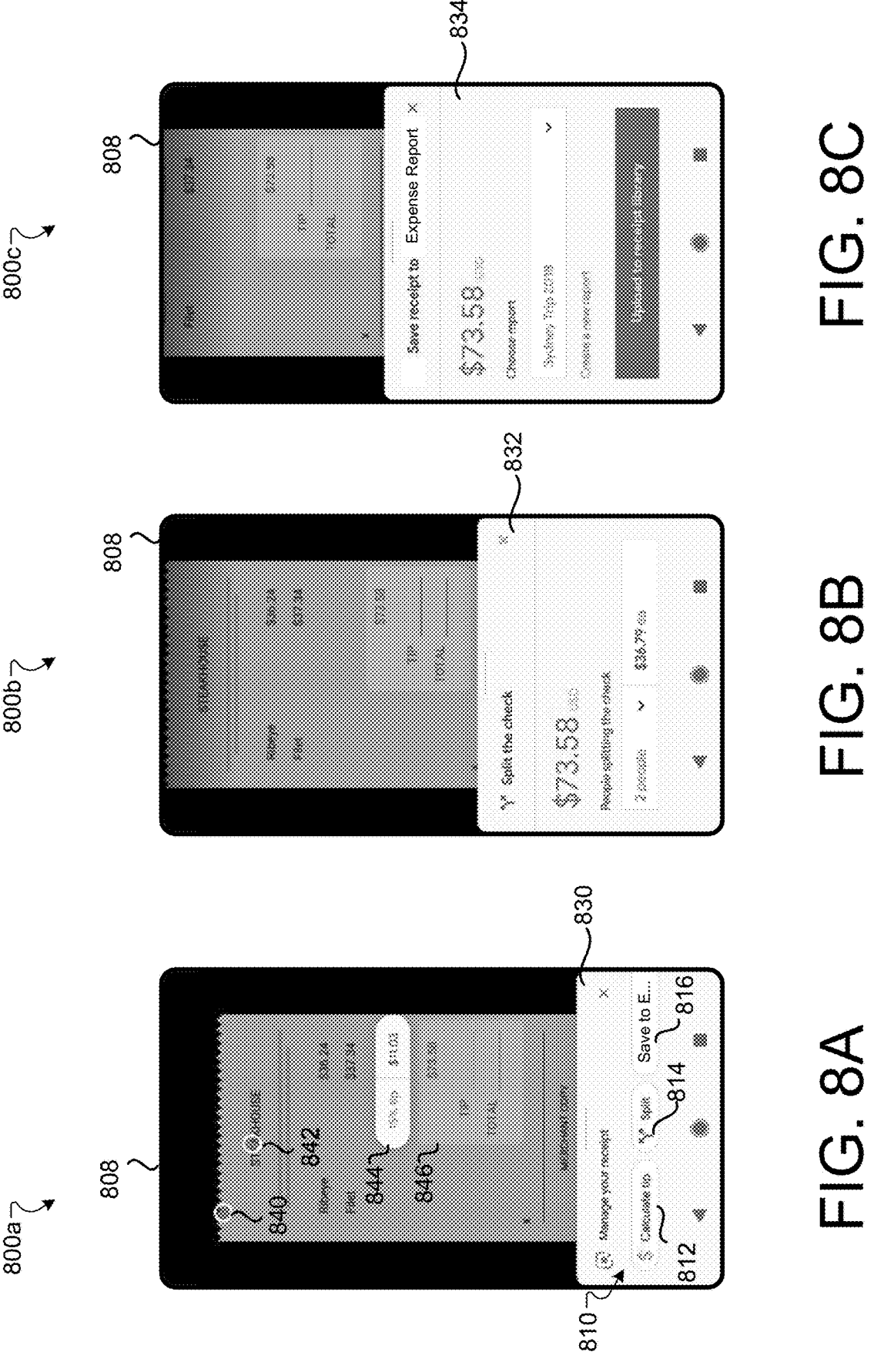
FIGS. 8A-8C are schematic diagrams of user interface screens displayed by embodiments of the client computing device of FIG. 1 to conduct a visual-content search and displaying a digital supplement.

FIGS. 8A-8C are schematic diagrams of user interface screens displayed by embodiments of the client computing device 102 to conduct a visual-content search and display a digital supplement. In this example, the visual-content search is based on an image of a receipt.

In FIG. 8A a user interface screen 800a is shown. The user interface screen 800a includes an image display panel 808 and an information panel 830. In this example, the image display panel 808 is displaying an image of a receipt from a restaurant. The image display panel 808 also includes an indicator 840, an indicator 842, an annotation 844, and a highlight overlay 846. In this case, the indicator 840 is associated with the receipt as a document, and the indicator 842 is associated with a specific restaurant named on the receipt. The identified receipt document and the identified restaurant name are both examples of supplement anchors.

The annotation 844 is associated with a digital supplement that provides a tip calculator. In this example, an example tip calculation is included on the annotation 844 and is overlaid at the appropriate position on the image display panel 808. In some implementations, a digital supplement may be selected by default and displayed upon identifying an appropriate supplement anchor. The highlight overlay 846 is overlaid over a portion of the receipt document that includes information used by the tip calculator digital supplement.

In this example, the items displayed in the information panel 830 relate to the receipt as a document, as though the indicator 840 had been actuated. In some implementations, identified supplement anchors are ranked based on the likely relevance or interests of the user based, for example, on the user's past actions, other user's actions for similar images, confidence scores for the supplement anchors, or the position or size of the portion of the image that the supplement anchors relate. The information panel 830 may then display items related to the highest ranked supplement anchor in at least some implementations. If instead, the indicator 842 were actuated the information panel 830 might include items about the specific restaurant.

Here, the information panel 830 includes a digital supplement selection panel 810. The digital supplement panel includes a user-actuatable control 812, a user-actuatable control 814, and a user-actuatable control 816. In this example, the user-actuatable control 812 is associated with a tip calculator digital supplement, the user-actuatable control 814 is associated with a check splitting digital supplement, and the user-actuatable control 816 is associated with an expense report digital supplement. For example, upon actuation of the user-actuatable control 812, user interface controls for adjusting parameters of the tip calculator may be displayed (e.g., to adjust the percentage).

In FIG. 8B, a user interface screen 800b is shown after a user has actuated the user-actuatable control 814. After actuation, an expanded information panel 832 is shown that includes items to help a user calculate how to split a check. For example, the number of people splitting the check can be entered to determine the amount each should pay.

In FIG. 8C, a user interface screen 800c is shown after a user has actuated the user-actuatable control 816. After actuation, an expanded information panel 834 is shown that includes items to help a user store the receipt to an expense report. For example, the user can select an expense report with which the receipt should be associated (e.g., "Sydney trip 2018"). Once the expense report is selected, an image of the receipt may be uploaded to an expense report submission or management system. In some implementations, the full image that is shown on the image display panel 808 is uploaded. In some implementations, a portion of the image is uploaded (e.g., the image is cropped to include only the receipt).

Figure 9B:
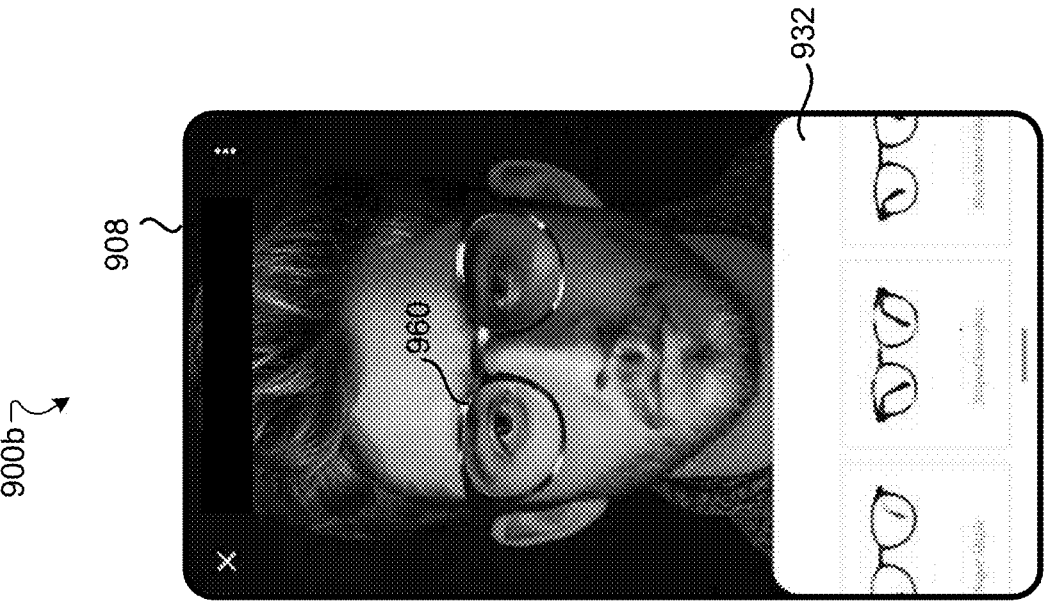
FIGS. 9A and 9B are schematic diagrams of user interface screens displayed by embodiments of the client computing device of FIG. 1 to conduct a visual-content search and display a digital supplement.
Figure 9A:
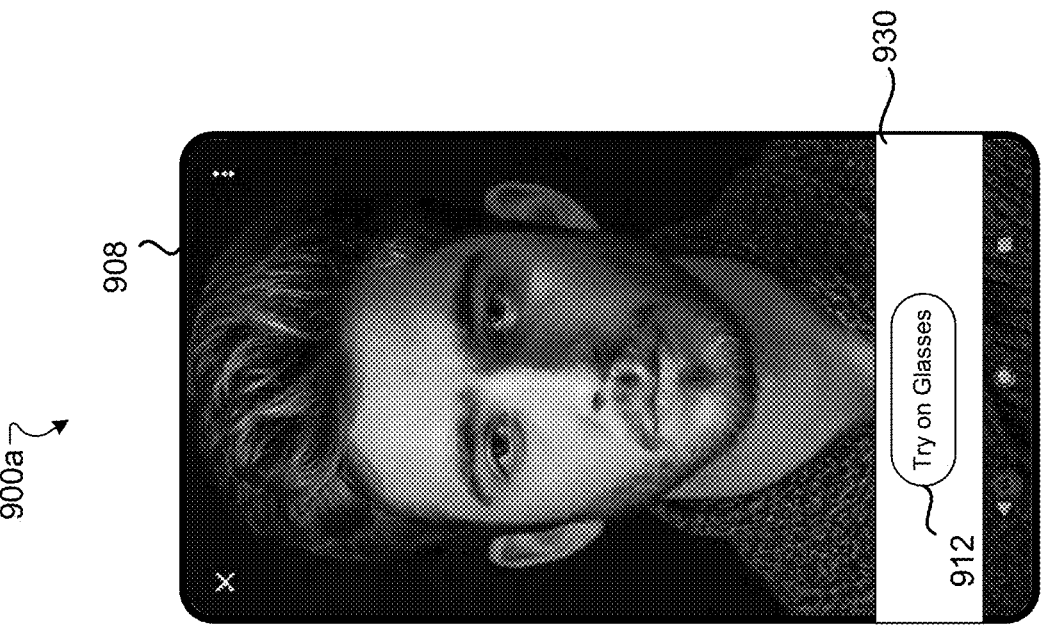

FIGS. 9A and 9B are schematic diagrams of user interface screens displayed by embodiments of the client computing device 102 to conduct a visual-content search and display a digital supplement. In this example, the visual-content search is based on an image of a face.

In FIG. 9A a user interface screen 900a is shown. The user interface screen 900a includes an image display panel 908 and an information panel 930. In this example, the image display panel 908 is displaying an image of a face. Here, the face is an example of a supplement anchor. The information panel 930 includes a user-actuatable control 912 for a digital supplement that was identified for the supplement anchor in the image (i.e., the face). The user-actuatable control 912 is associated with a digital supplement for tying on glasses.

In FIG. 9B, a user interface screen 900b is shown after a user has actuated the user-actuatable control 912. After actuation, an expanded information panel 932 is shown that includes items to help a user visually try glasses on the face in the image. Here, multiple glasses styles are displayed and the user can select a pair to try on. Upon selecting a pair of glasses, AR content 960 is overlaid on the image display panel 908. Here, the AR content 960 corresponds to the selected glasses and is sized to match the face in the image. In some implementations, when the digital supplement for trying on glasses is selected, the image shown in the image display panel 908 is transmitted to a server that provides the digital supplement so that the image can be analyzed to determine where and how to position and size the AR content 960 or to recommend glasses to try on.

Figures 10A, 10B, 10C:
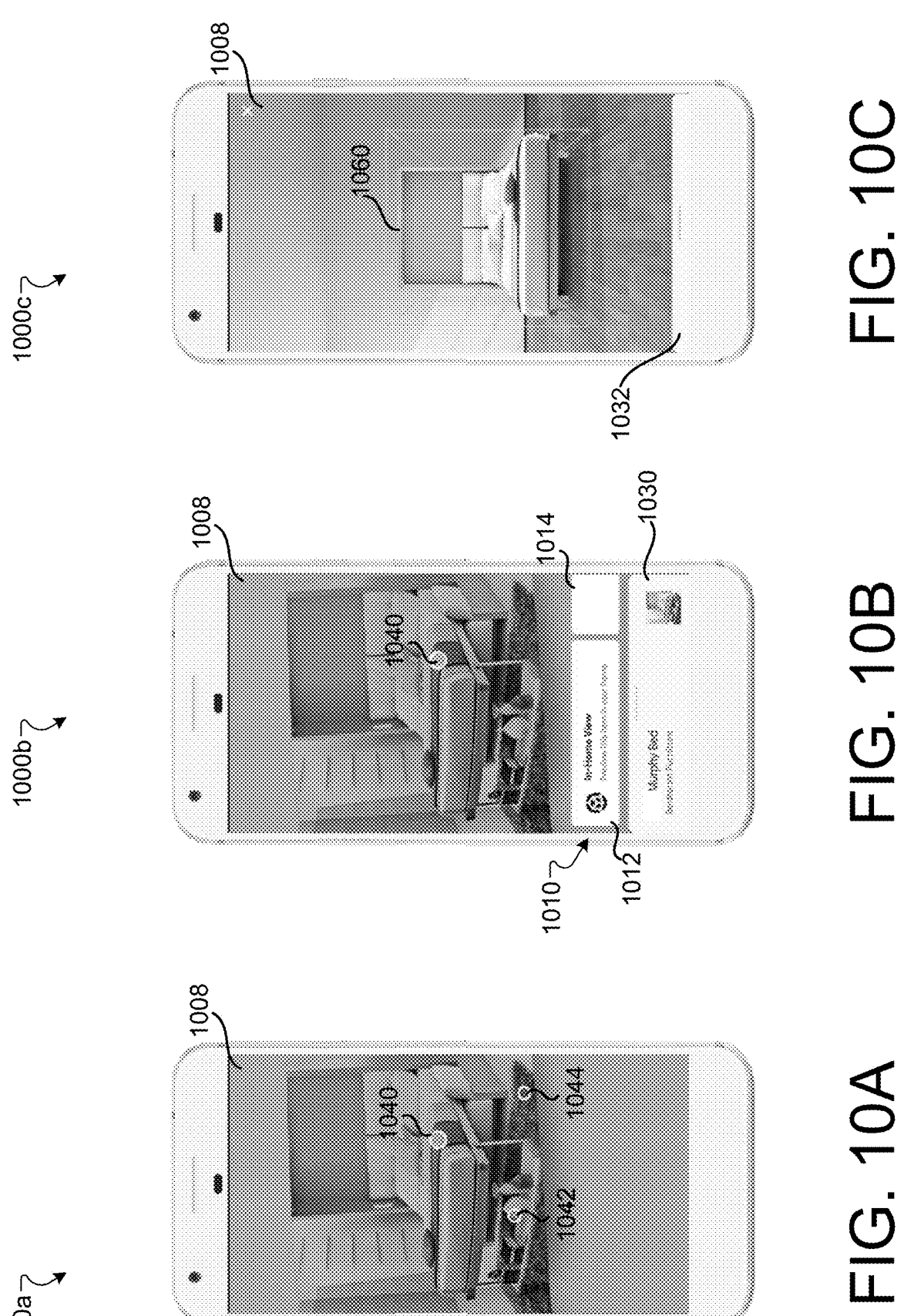
FIGS. 10A-10C are schematic diagrams of user interface screens displayed by embodiments of the client computing device of FIG. 1 to conduct a visual-content search and display a digital supplement.

FIGS. 10A-10C are schematic diagrams of user interface screens displayed by embodiments of the client computing device 102 to conduct a visual-content search and display a digital supplement. In this example, the visual-content search is based on an image of furniture in a catalog.

In FIG. 10A, a user interface screen 1000a is shown. The user interface screen 1000a includes an image display panel 1008. In this example, the image display panel 1008 is displaying an image of a portion of a page of a furniture catalog. The image display panel also includes an indicator 1040, an indicator 1042, and an indicator 1044. In this example, the indicator 1040 is associated with a bed, the indicator 1042 is associated with a decorative item, and the indicator 1044 is associated with a rug. The images of the bed, the decorative item, and the run in the catalog are examples of supplement anchors.

In FIG. 10B, a user interface screen 1000b is shown after a user has selected the indicator 1040 (e.g., by touching the screen at or near where the indicator 1040 is displayed). The user interface screen 1000b includes a digital supplement selection panel 1010 and an information panel 1030. The information panel 1030 includes information (e.g., a product name, description, and image) about the supplement anchor associated with the selected indicator.

The digital supplement selection panel 1010 includes a user-actuatable control 1012 and a user-actuatable control 1014. The user-actuatable control 1012 is associated with a digital supplement that provides an in-home view. The user-actuatable control 1014 is associated with another digital supplement (e.g., a digital supplement for posting to a social media site).

In FIG. 10C, a user interface screen 1000c is shown after actuation of the user-actuatable control 1012. The user interface screen 1000c includes the image display panel 1008, a digital supplement selection panel 1010 and a reduced information panel 1032. The reduced information panel 1032 may include a user-actuatable control that when actuated may cause the information panel to pop-up and be displayed.

Here, the image display panel 1008 now displays an image of a room and includes AR content 1060. The AR content 1060 includes a 3D model of the bed associated with the indicator 1040 overlaid on the image panel. The user may able to adjust the position of the AR content 1060 within the room to see how the bed would fit in the room. In some implementations, when the digital supplement for in-home view is selected, the image shown in the image display panel 1008 is transmitted to a server that provides the digital supplement so that the image can be analyzed to determine where and how to position and size the AR content 1060. In some implementations, the AR content 1060 may provided at a later time than the visual-content query.

Figures 11A, 11B, 11C:
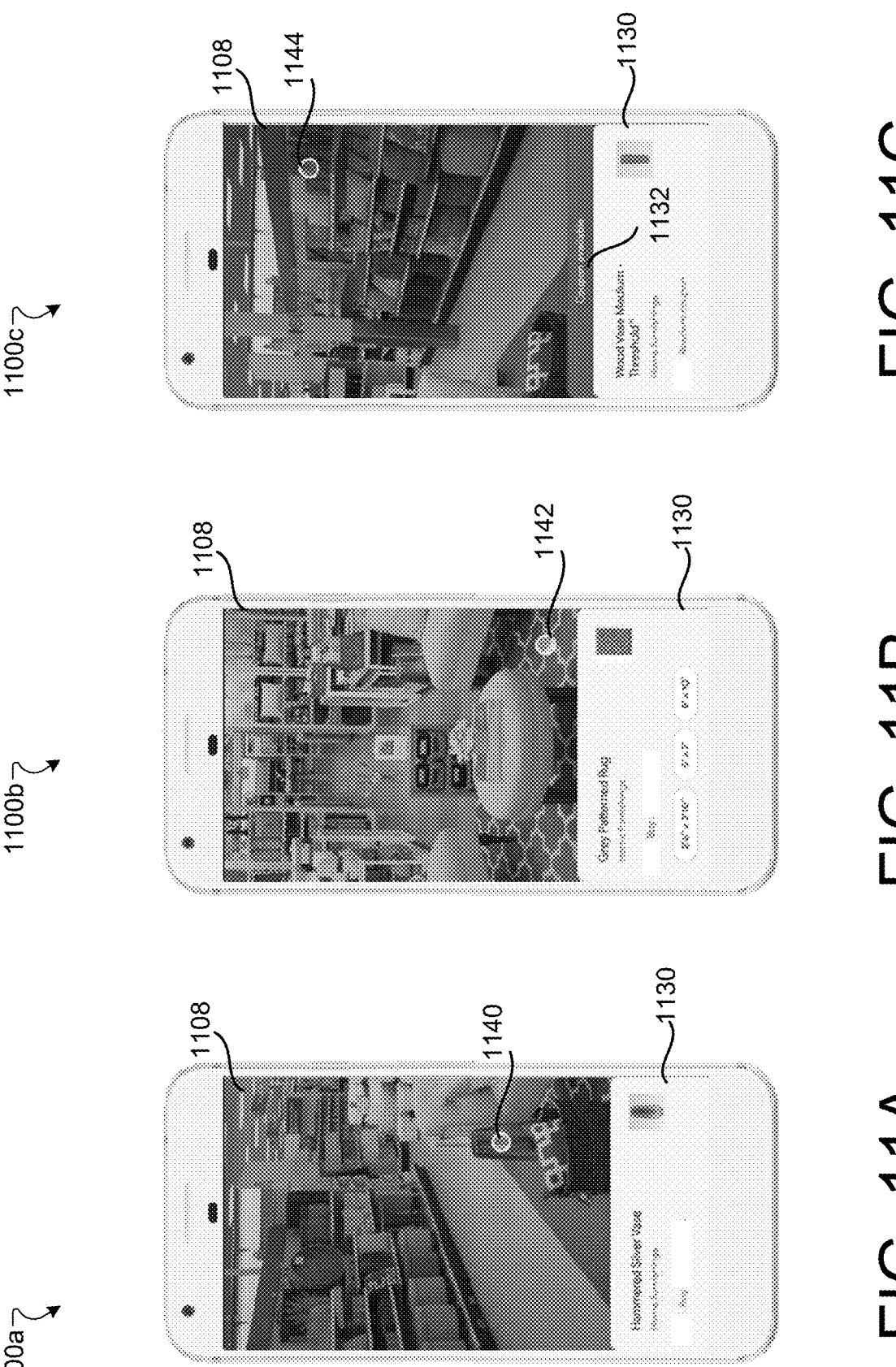
FIGS. 11A-11C are schematic diagrams of user interface screens displayed by embodiments of the client computing device of FIG. 1 to conduct various visual-content searches within a store.

FIGS. 11A-11C are schematic diagrams of user interface screens displayed by embodiments of the client computing device 102 to conduct various visual-content searches within a store. In this example, the visual-content searches are based on images of products captured within a store.

In FIG. 11A, a user interface screen 1100a is shown. The user interface screen 1100a includes an image display panel 1108 and an information panel 1130. In this example, the image display panel 1108 is displaying an image captured within a store. The image display panel 1108 also includes an indicator 1140 that is associated with a vase. The vase displayed on the image display panel 1108 is an example of a supplement anchor. The information panel 1130 is displaying a digital supplement that includes product information about the vase and functionality to buy the vase. The digital supplement may, for example, include a workflow to initiate a purchase of the vase In this example, the digital supplement is identified based on the image content and the location of the client-computing device so that a digital supplement published by the store (or associated with the store) in which the image was captured can be identified and provided as a high-ranking result to a visual-content query when a client computing device is in the store. In some implementations, a different digital supplement would be provided for the same image if the location of the client computing device were changed.

In FIG. 11B, a user interface screen 1100b is shown. The user interface screen 1100b includes an image display panel 1108 and an information panel 1130. In this example, the image display panel 1108 is displaying another image captured within a store. The image display panel 1108 also includes an indicator 1142 that is associated with a rug. The rug displayed on the image display panel 1108 is an example of a supplement anchor. The information panel 1130 is displaying a digital supplement that includes product information about the rug and functionality to select a size and buy the rug. Like in FIG. 11A, the digital supplement is identified based on the image content and the location of the client-computing device.

In FIG. 11C, a user interface screen 1100c is shown. The user interface screen 1100c includes an image display panel 1108 and an information panel 1130. In this example, the image display panel 1108 is displaying another image captured within a store. The image display panel 1108 also includes an indicator 1144 that is associated with a vase. The vase displayed on the image display panel 1108 is an example of a supplement anchor. The information panel 1130 is displaying a digital supplement that includes product information about the vase. The information panel 1130 also includes a coupon indicator 1132 and functionality to redeem the coupon. Redeeming the coupon may include purchasing the item at a discounted price from a website associated with the store. In some implementations, a coupon code is presented that can be used to secure a discount during checkout. Like in FIGS. 11A and 11B, the digital supplement is identified based on the image content and the location of the client-computing device.

Figure 12C:
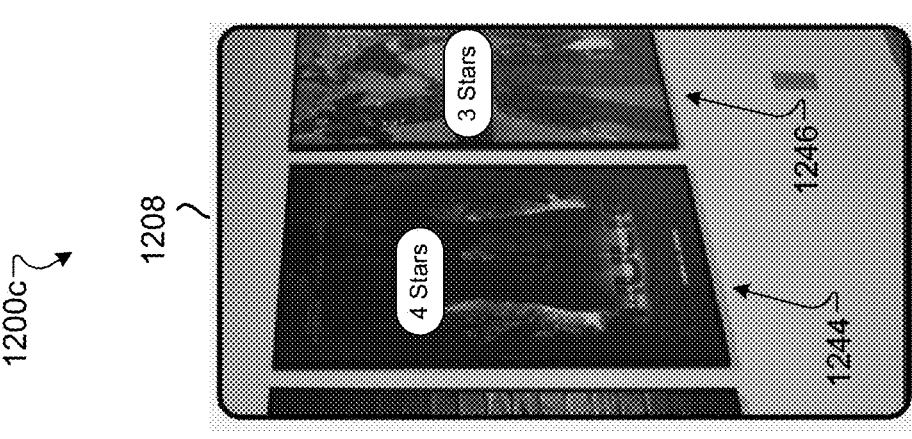
FIGS. 12A-12C are schematic diagrams of user interface screens displayed by embodiments of the client computing device of FIG. 1 during various visual-content searches.
Figure 12B:
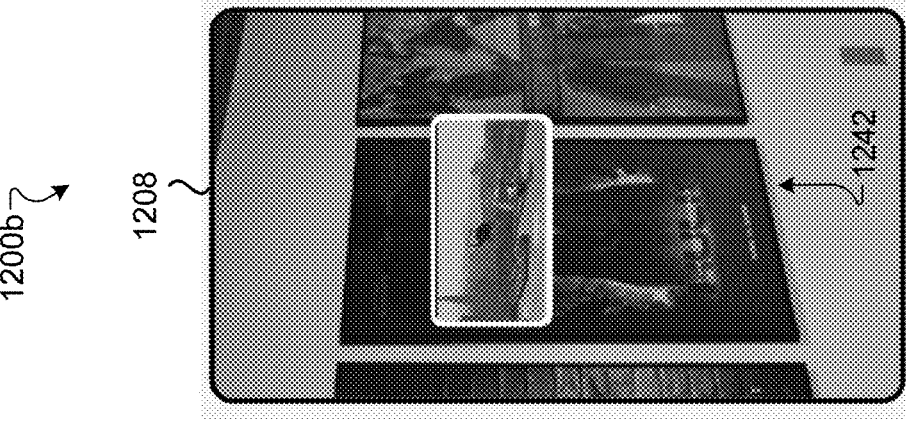
Figure 12A:

FIGS. 12A-12C are schematic diagrams of user interface screens displayed by embodiments of the client computing device 102 during various visual-content searches. In this example, the visual-content searches are based on images of movie posters (e.g., as might be captured at a movie theatre).

In FIG. 12A, a user interface screen 1200a is shown. The user interface screen 1200a includes an image display panel 1208. In this example, the image display panel 1208 is displaying an image of movie posters. The image display panel 1208 also includes an indicator 1240 that is associated with a movie poster identified in the image. The movie poster is an example of a supplement anchor. The indicator 1240 may include a user-actuatable control that when actuated will display a digital supplement or a menu to select a digital supplement.

In FIG. 12B, a user interface screen 1200b is shown. The image display panel 1208 also includes a preview digital supplement 1242 that is associated with the movie poster identified in the image. For example, the preview digital supplement 1242 may be shown after actuation of the indicator 1240 (of FIG. 12A). The preview digital supplement 1242 may overlay an image or video from a movie associated with the identified movie poster on the image of the movie poster.

In FIG. 12C, a user interface screen 1200c is shown. The image display panel 1208 also includes a rating indicator 1244 and a rating indicator 1246. The rating indicator 1244 and the rating indicator 1246 may be generated by one or more digital supplements in response to a visual-content query that includes movie posters. The digital supplement, may for example, overlay ratings information for the movies associated with the movie posters in the image. The rating indicator 1244 and the rating indicator 1246 may include user-actuatable controls that when actuated cause additional information about the ratings and the associated movie to be shown.

Figure 13:
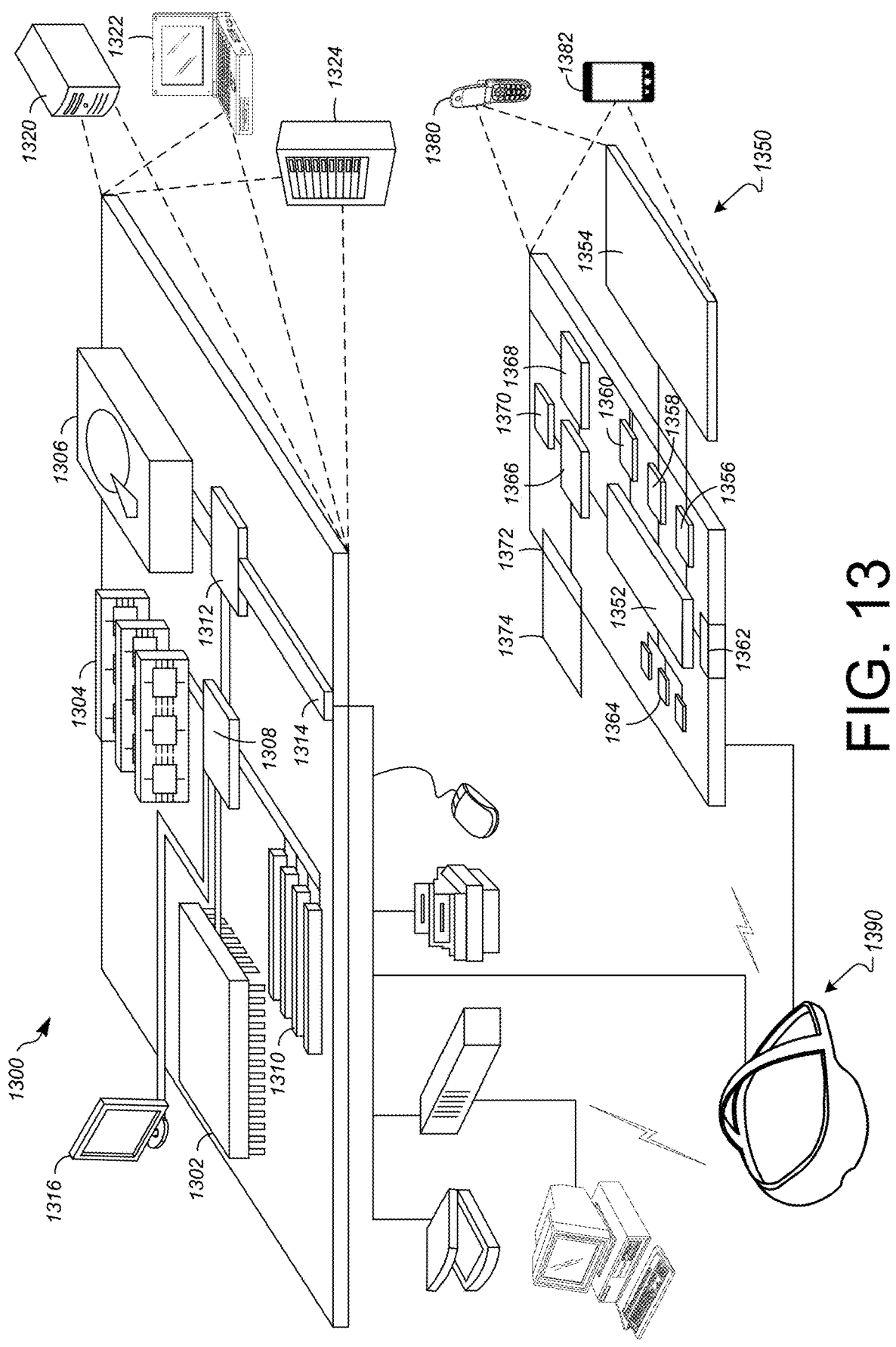
FIG. 13 is a schematic diagram of an example of a computer device and a mobile computer device that can be used to implement the techniques described herein.

FIG. 13 shows an example of a computing device 1300 and a mobile computing device 1350, which may be used with the techniques described here (e.g., to implement the client computing device 102, the search server 152, and the digital supplement server 172). The computing device 1300 includes a processor 1302, memory 1304, a storage device 1306, a high-speed controller 1308 connecting to memory 1304 and high-speed expansion ports 1310, and a low-speed controller 1312 connecting to low-speed expansion port 1314 and storage device 1306. Each of the components 1302, 1304, 1306, 1308, 1310, and 1312, are interconnected using various busses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as display 1316 coupled to high-speed controller 1308. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1304 stores information within the computing device 1300. In one implementation, the memory 1304 is a volatile memory unit or units. In another implementation, the memory 1304 is a non-volatile memory unit or units. The memory 1304 may also be another form of computer-readable medium, such as a magnetic or optical disk.

The storage device 1306 is capable of providing mass storage for the computing device 1300. In one implementation, the storage device 1306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1304, the storage device 1306, or memory on processor 1302.

The high-speed controller 1308 manages bandwidth-intensive operations for the computing device 1300, while the low-speed controller 1312 manages lower bandwidth-intensive operations. Such allocation of functions is exemplary only. In one implementation, the high-speed controller 1308 is coupled to memory 1304, display 1316 (e.g., through a graphics processor or accelerator), and to high-speed expansion ports 1310, which may accept various expansion cards (not shown). In the implementation, low-speed controller 1312 is coupled to storage device 1306 and low-speed expansion port 1314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1320, or multiple times in a group of such servers. It may also be implemented as part of a rack server system 1324. In addition, it may be implemented in a personal computer such as a laptop computer 1322. Alternatively, components from computing device 1300 may be combined with other components in a mobile device (not shown), such as device 1350. Each of such devices may contain one or more of computing device 1300, 1350, and an entire system may be made up of multiple computing devices 1300, 1350 communicating with each other.

Computing device 1350 includes a processor 1352, memory 1364, an input/output device such as a display 1354, a communication interface 1366, and a transceiver 1368, among other components. The device 1350 may also be provided with a storage device, such as a microdrive or other device, to provide additional storage. Each of the components 1350, 1352, 1364, 1354, 1366, and 1368, are interconnected using various buses, and several of the components may be mounted on a common motherboard or in other manners as appropriate.

The processor 1352 can execute instructions within the computing device 1350, including instructions stored in the memory 1364. The processor may be implemented as a chipset of chips that include separate and multiple analog and digital processors. The processor may provide, for example, for coordination of the other components of the device 1350, such as control of user interfaces, applications run by device 1350, and wireless communication by device 1350.

Processor 1352 may communicate with a user through control interface 1358 and display interface 1356 coupled to a display 1354. The display 1354 may be, for example, a TFT LCD (Thin-Film-Transistor Liquid Crystal Display), and LED (Light Emitting Diode) or an OLED (Organic Light Emitting Diode) display, or other appropriate display technology. The display interface 1356 may include appropriate circuitry for driving the display 1354 to present graphical and other information to a user. The control interface 1358 may receive commands from a user and convert them for submission to the processor 1352. In addition, an external interface 1362 may be provided in communication with processor 1352, so as to enable near area communication of device 1350 with other devices. External interface 1362 may provide, for example, for wired communication in some implementations, or for wireless communication in other implementations, and multiple interfaces may also be used.

The memory 1364 stores information within the computing device 1350. The memory 1364 can be implemented as one or more of a computer-readable medium or media, a volatile memory unit or units, or a non-volatile memory unit or units. Expansion memory 1374 may also be provided and connected to device 1350 through expansion interface 1372, which may include, for example, a SIMM (Single In-Line Memory Module) card interface. Such expansion memory 1374 may provide extra storage space for device 1350, or may also store applications or other information for device 1350. Specifically, expansion memory 1374 may include instructions to carry out or supplement the processes described above, and may include secure information also. Thus, for example, expansion memory 1374 may be provided as a security module for device 1350, and may be programmed with instructions that permit secure use of device 1350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1364, expansion memory 1374, or memory on processor 1352, that may be received, for example, over transceiver 1368 or external interface 1362.

Device 1350 may communicate wirelessly through communication interface 1366, which may include digital signal processing circuitry where necessary. Communication interface 1366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1368. In addition, short-range communication may occur, such as using a Bluetooth, Wi-Fi, or other such transceiver (not shown). In addition, GPS (Global Positioning System) receiver module 1370 may provide additional navigation- and location-related wireless data to device 1350, which may be used as appropriate by applications running on device 1350.

Device 1350 may also communicate audibly using audio codec 1360, which may receive spoken information from a user and convert it to usable digital information. Audio codec 1360 may likewise generate audible sound for a user, such as through a speaker, e.g., in a handset of device 1350. Such sound may include sound from voice telephone calls, may include recorded sound (e.g., voice messages, music files, etc.) and may also include sound generated by applications operating on device 1350.

The computing device 1350 may be implemented in a number of different forms, as shown in the figure. For example, it may be implemented as a cellular telephone 1380. It may also be implemented as part of a smartphone 1382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 13 can include sensors that interface with an AR headset/HMD device 1390 to generate an augmented environment for viewing inserted content within the physical space. For example, one or more sensors included on a computing device 1350 or other computing device depicted in FIG. 13, can provide input to the AR headset 1390 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 1350 can use the sensors to determine an absolute position and/or a detected rotation of the computing device in the AR space that can then be used as input to the AR space. For example, the computing device 1350 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 1350 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1350 when the computing device is incorporated into the AR space can cause a particular action to occur in the AR space.

In some implementations, a touchscreen of the computing device 1350 can be rendered as a touchpad in AR space. A user can interact with the touchscreen of the computing device 1350. The interactions are rendered, in AR headset 1390 for example, as movements on the rendered touchpad in the AR space. The rendered movements can control virtual objects in the AR space.

In some implementations, one or more output devices included on the computing device 1350 can provide output and/or feedback to a user of the AR headset 1390 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1350 may appear as another object in a computer-generated, 3D environment. Interactions by the user with the computing device 1350 (e.g., rotating, shaking, touching a touchscreen, swiping a finger across a touch screen) can be interpreted as interactions with the object in the AR space. In the example of the laser pointer in an AR space, the computing device 1350 appears as a virtual laser pointer in the computer-generated, 3D environment. As the user manipulates the computing device 1350, the user in the AR space sees movement of the laser pointer. The user receives feedback from interactions with the computing device 1350 in the AR environment on the computing device 1350 or on the AR headset 1390. The user's interactions with the computing device may be translated to interactions with a user interface generated in the AR environment for a controllable device.

In some implementations, a computing device 1350 may include a touchscreen. For example, a user can interact with the touchscreen to interact with a user interface for a controllable device. For example, the touchscreen may include user interface elements such as sliders that can control properties of the controllable device.

Computing device 1300 is intended to represent various forms of digital computers and devices, including, but not limited to laptops, desktops, workstations, personal digital assistants, servers, blade servers, mainframes, and other appropriate computers. Computing device 1350 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method, comprising:
receiving, by a server, a visual content query from a client device, the visual content query comprising image data;
detecting, by the server, an entity within the image data;
interfacing, by the server, with a digital supplement server to identify data associated with digital supplements;
identifying, by the server interfacing with the digital supplement server, a plurality of digital supplements associated with the entity detected within the image data;
identifying, by the server, client device data comprising at least one of a location of the client device from which the visual content query is received or specifications associated with the client device from which the visual content query is received;
associating, by the server, a relevance score representing a relevance of each of the plurality of digital supplements based on the entity detected within the image data and at least one of the client device data or user profile data associated with the client device;
ranking, by the server, the plurality of digital supplements in response to the associating of the relevance score representing the relevance of each of the plurality of digital supplements to the entity detected within the image data;
generating, by the server, an ordered list of the plurality of digital supplements in a ranked order in response to the ranking of the plurality of digital supplements; and
causing, by the server, corresponding content associated with the digital supplements to be displayed by the client device in the ranked order by transmitting, to the client device, the ordered list of digital supplements based on the visual content query.

2. The computer-implemented method of claim 1, wherein one of the plurality of digital supplements is utilized to provide a three-dimensional model corresponding to the entity detected within the image data, and
wherein transmitting the ordered list of digital supplements comprises transmitting, based on the visual content query, the ordered list of digital supplements, the digital supplement utilized to provide the three-dimensional model, and at least one other digital supplement of the plurality of digital supplements.

3. The computer-implemented method of claim 2, wherein associating the relevance score includes associating a higher relevance score with the digital supplement utilized to provide the three-dimensional model, and
wherein transmitting the ordered list of digital supplements further comprises transmitting the ordered list based on the ranked order listing the digital supplement utilized to provide the three-dimensional model higher than the at least one other digital supplement.

4. The computer-implemented method of claim 1, wherein detecting an entity includes:
detecting a plurality of entities within the image data;
identifying corresponding digital supplements associated with the plurality of entities; and
identifying a target entity from the plurality of entities based on cumulative relevance scores of the digital supplements associated with each of the plurality of entities.

5. The computer-implemented method of claim 1, further comprising analyzing the specifications associated with the client device, including:
identifying required device capabilities for each of the plurality of digital supplements;
determining capabilities of the client device based on the specifications associated with the client device;

comparing the required device capabilities for each of the plurality of digital supplements to the capabilities of the client device;

associating a higher relevance score with each of the digital supplements having required device capabilities that are satisfied by the capabilities of the client device; and associating a lower relevance score with each of the digital supplements having required device capabilities that are not satisfied by the capabilities of the client device.

6. The computer-implemented method of claim 1, further comprising:

associating a prestige score, representing a prestige of each of the plurality of digital supplements, with each of the plurality of digital supplements based on a number of other network accessible resources that link to a respective digital supplement, wherein ranking the plurality of digital supplements comprises ranking the plurality of digital supplements in response to the associating of the relevance score with each of the plurality of digital supplements, and further in response to the associating of the prestige score with each of the plurality of digital supplements based on the number of the other network accessible resources that link to the respective digital supplement.

7. The computer-implemented method of claim 1, wherein associating the relevance score includes:

identifying digital supplements of the plurality of digital supplements requiring installation of an application for access to the digital supplements;

identifying applications installed on the client device;

associating higher relevance scores with digital supplements of the plurality of digital supplements having application requirements satisfied by the client device; and associating lower relevance scores with digital supplements of the plurality of digital supplements having application requirements that are not satisfied by the client device.

8. The computer-implemented method of claim 1, wherein associating the relevance score includes:

determining a subscription status of a user of the client device based on the user profile data associated with the client device;

identifying digital supplements of the plurality of digital supplements requiring subscriptions for access to the digital supplements;

associating higher relevance scores with digital supplements of the plurality of digital supplements having subscription requirements satisfied by the client device; and associating lower relevance scores with digital supplements of the plurality of digital supplements having subscription requirements that are not satisfied by the client device.

9. The computer-implemented method of claim 1, wherein associating the relevance score includes:

determining user preferences of a user of the client device based on the user profile data associated with the client device; and associating relevance scores with the plurality of digital supplements based on the user preferences.

10. A non-transitory computer-readable medium storing executable instructions that, when executed by a processor of a computing system, to cause processor to:

detect an entity within image data in a visual content query received from a client device;

interface with a digital supplement server to identify data associated with digital supplements;

identify a plurality of digital supplements associated with the entity detected within the image data;

identify client device data comprising at least one of a location of the client device from which the visual content query is received or specifications associated with the client device from which the visual content query is received;

associate a relevance score, representing a relevance of each of the plurality of digital supplements based on the entity detected within the image data and at least one of the client device data or user profile data associated with the client device;

rank the plurality of digital supplements in response to the associating of the relevance score, representing the relevance of each of the plurality of digital supplements to the entity detected within the image data;

generate an ordered list of the plurality of digital supplements in a ranked order in response to the ranking of the plurality of digital supplements; and cause corresponding content associated with the digital supplements to be displayed by the client device in the ranked order by transmitting, to the client device, the ordered list of digital supplements based on the ranking in response to the visual content query.

11. The non-transitory computer-readable medium of claim 10, wherein the instructions cause the processor to identify the plurality of digital supplements, one of the plurality of digital supplements is utilized to provide a three-dimensional model corresponding to the entity detected within the image data, and wherein transmitting the ordered list of digital supplements comprises transmitting, based on the visual content query, the ordered list of digital supplements, the digital supplement utilized to provide the three-dimensional model, and at least one other digital supplement of the plurality of digital supplements.

12. The non-transitory computer-readable medium of claim 11, wherein the instructions cause the processor to associate a higher relevance score with the digital supplement utilized to provide the three-dimensional model, and wherein transmitting the ordered list of digital supplements further comprises transmitting the ordered list based on the ranked order listing the digital supplement utilized to provide the three-dimensional model higher than the at least one other digital supplement.

13. The non-transitory computer-readable medium of claim 10, wherein the instructions cause the processor to:

detect a plurality of entities within the image data;

identify corresponding digital supplements associated with the plurality of entities; and identify a target entity from the plurality of entities based on cumulative relevance scores of the digital supplements associated with each of the plurality of entities.

14. The non-transitory computer-readable medium of claim 10, wherein the instructions cause the processor to analyze the specifications associated with the client device, including:

identify required device capabilities for each of the plurality of digital supplements;

determine capabilities of the client device based on the specifications associated with the client device;

compare the required device capabilities for each of the plurality of digital supplements to the capabilities of the client device;

associate a higher relevance score with each of the digital supplements having required device capabilities that are satisfied by the capabilities of the client device; and associate a lower relevance score with each of the digital supplements having required device capabilities that are not satisfied by the capabilities of the client device.

15. The non-transitory computer-readable medium of claim 10, wherein the instructions cause the processor to:

associate a prestige score, representing a prestige of each of the plurality of digital supplements, with each of the plurality of digital supplements based on a number of other network accessible resources that link to a respective digital supplement, wherein ranking the plurality of digital supplements comprises ranking the plurality of digital supplements in response to the associating of the relevance score with each of the plurality of digital supplements, and further in response to the associating of the prestige score with each of the plurality of digital supplements based on the number of the other network accessible resources that link to the respective digital supplement.

16. The non-transitory computer-readable medium of claim 10, wherein the instructions cause the processor to associate the relevance score with each of the plurality of digital supplements, including:

identify digital supplements of the plurality of digital supplements requiring installation of an application for access to the digital supplements;

identify applications installed on the client device;

associate higher relevance scores with digital supplements of the plurality of digital supplements having application requirements satisfied by the client device; and associate lower relevance scores with digital supplements of the plurality of digital supplements having application requirements that are not satisfied by the client device.

17. The non-transitory computer-readable medium of claim 10, wherein the instructions cause the processor to associate the relevance score with each of the plurality of digital supplements, including:

determine a subscription status of a user of the client device based on the user profile data associated with the client device;

identify digital supplements of the plurality of digital supplements requiring subscriptions for access to the digital supplements;

associate higher relevance scores with digital supplements of the plurality of digital supplements having subscription requirements satisfied by the client device; and associate lower relevance scores with digital supplements of the plurality of digital supplements having subscription requirements that are not satisfied by the client device.

18. The non-transitory computer-readable medium of claim 10, wherein the instructions cause the processor to associate the relevance score with each of the plurality of digital supplements, including:

determine user preferences of a user of the client device based on the user profile data associated with the client device; and associate relevance scores with the plurality of digital supplements based on the user preferences.

19. The computer-implemented method of claim 1, further comprising:

identifying at least one of required device capabilities for each of the plurality of digital supplements, application installation requirements for access to each of the plurality of digital supplements, or a subscription status of a user of the client device based on the user profile data associated with the client device, wherein associating the relevance score further comprises associating the relevance score with each of the plurality of digital supplements based on the entity detected within the image data, the at least one of the client device data or the user profile data, and the at least two of the required device capabilities, the application installation requirements, or the subscription status.

20. The computer-implemented method of claim 1, wherein the content associated with the plurality of digital supplements includes corresponding three-dimensional models of entities within the image data, further comprising:

causing, by the server and in response to the transmitting of the ordered list of digital supplements, the client device to present, in a user interface, the three-dimensional models of the entities.

* * * * *